United States Patent
Morarity et al.

(10) Patent No.: US 10,303,044 B2
(45) Date of Patent: May 28, 2019

(54) SCANNING MIRROR CONTROL AND SLOW SCAN POSITION OFFSET

(71) Applicant: Microvision, Inc., Redmond, WA (US)

(72) Inventors: Jonathan A. Morarity, Seattle, WA (US); Damon M. Domjan, Seattle, WA (US)

(73) Assignee: Microvision, Inc., Redmond, WA (US)

( * ) Notice: Subject to any disclaimer, the term of this patent is extended or adjusted under 35 U.S.C. 154(b) by 135 days.

(21) Appl. No.: 15/715,730

(22) Filed: Sep. 26, 2017

(65) Prior Publication Data

US 2019/0094667 A1     Mar. 28, 2019

(51) Int. Cl.
| | |
|---|---|
| *H04N 9/31* | (2006.01) |
| *G02B 26/10* | (2006.01) |
| *G02B 26/12* | (2006.01) |
| *G03B 21/00* | (2006.01) |
| *H04N 5/74* | (2006.01) |

(52) U.S. Cl.
CPC ......... *G03B 21/008* (2013.01); *G02B 26/105* (2013.01); *G02B 26/122* (2013.01); *H04N 9/3129* (2013.01); *H04N 9/3161* (2013.01)

(58) Field of Classification Search
CPC .. H04N 9/3129; H04N 9/3161; H04N 9/3102; G03B 21/008; G02B 26/105; G02B 26/122
USPC ......................................................... 348/750
See application file for complete search history.

(56) References Cited

U.S. PATENT DOCUMENTS

| | | | |
|---|---|---|---|
| 8,248,541 B2 | 8/2012 | Brown et al. | |
| 2008/0144150 A1 | 6/2008 | Champion et al. | |
| 2008/0285103 A1* | 11/2008 | Mizumoto | G02B 26/0858 359/199.1 |
| 2010/0079836 A1* | 4/2010 | Rothaar | G02B 26/101 359/223.1 |
| 2011/0001888 A1* | 1/2011 | Brown | G02B 26/085 348/744 |
| 2012/0281024 A1 | 11/2012 | Champion | |
| 2013/0120819 A1* | 5/2013 | Rothaar | G02B 26/085 359/224.1 |
| 2013/0250388 A1* | 9/2013 | Nozaki | G02B 26/101 359/214.1 |
| 2014/0002804 A1 | 1/2014 | Tsai | |
| 2015/0021483 A1* | 1/2015 | Murayama | G01B 11/026 250/347 |
| 2016/0341955 A1* | 11/2016 | McVittie | G02B 26/0841 |
| 2017/0237880 A1 | 8/2017 | Saracco et al. | |

OTHER PUBLICATIONS

Microvision, Inc., , "PCT International Search Report and Written Opinion".

* cited by examiner

*Primary Examiner* — Michael Lee
(74) *Attorney, Agent, or Firm* — Kevin D. Wills

(57) ABSTRACT

A scanning mirror resonates on a first axis and moves on a second axis at a frequency dictated by a sync signal. The period of movement on the second axis is not necessarily an integer multiple of the period of movement on the first axis. A drive circuit excites movement of the mirror. The drive circuit adds a position offset to the signal that excites movement on the second axis. The position offset is capable of causing the resonant movement on the first axis to scan a substantially identical trajectory for at least a portion of each period on the second axis.

29 Claims, 21 Drawing Sheets

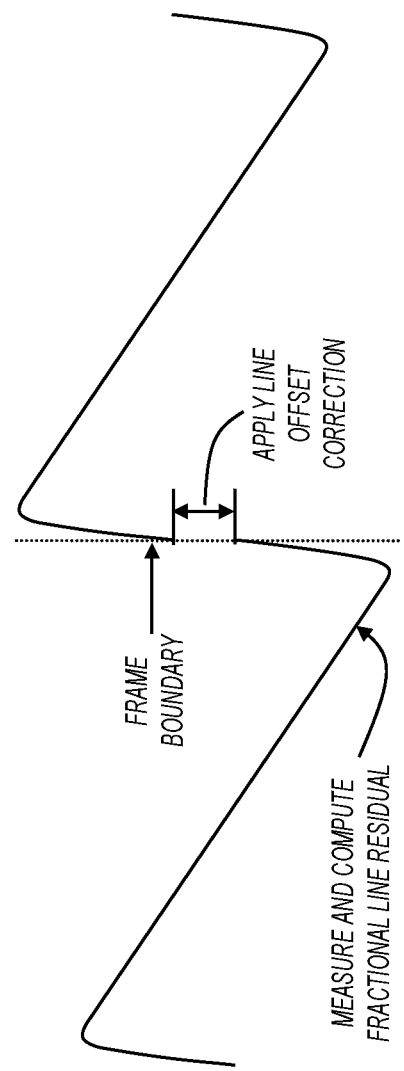

SCANNING MIRROR CONTROL AND SLOW SCAN POSITION OFFSET

FIELD

The present invention relates generally to resonant systems, and more specifically to excitation of resonant systems.

BACKGROUND

Resonant systems present familiar design challenges. When trying to control a resonant system at a peak of a resonant mode, a feedback control circuit is commonly employed to produce an excitation signal in an attempt to keep the system resonating at a particular frequency. Components within the feedback control circuit can have differing characteristics that increase the design challenges. For example, components may have characteristics that drift with time, age, and temperature.

BRIEF DESCRIPTION OF THE DRAWINGS

FIG. 11 shows mirror movement with a position offset on the slow scan axis in accordance with various embodiments of the present invention;

DESCRIPTION OF EMBODIMENTS

Figure 1:
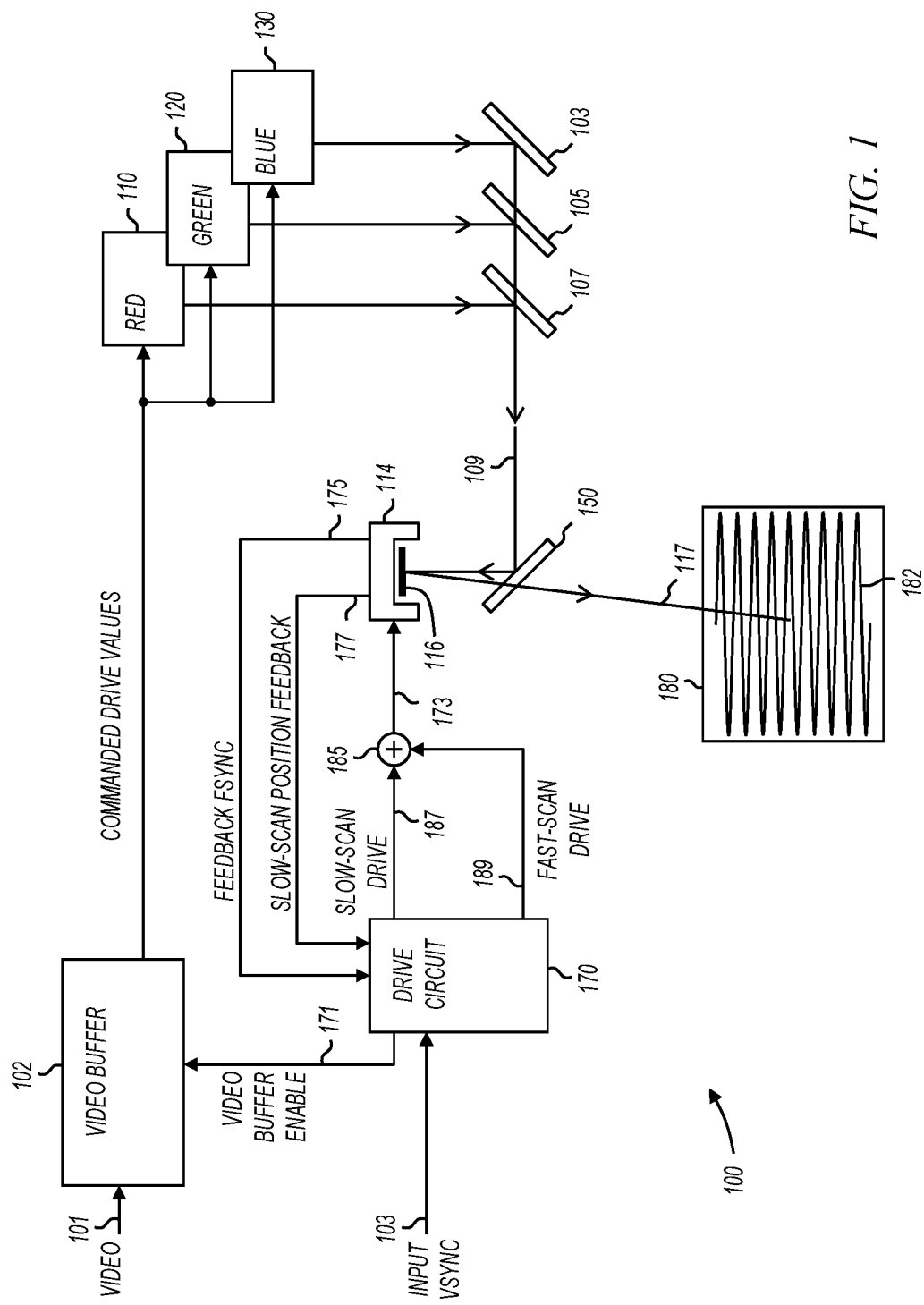
FIG. 1 shows a scanning laser projector in accordance with various embodiments of the present invention.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

FIG. 1 shows a scanning laser projector in accordance with various embodiments of the present invention. Scanning laser projector 100 includes video buffer 102, red laser module 110, green laser module 120, and blue laser module 130. Light from the laser modules is combined with dichroics 103, 105, and 107. Scanning laser projector 100 also includes fold mirror 150, drive circuit 170, and MEMS device 114 with scanning mirror 116.

In some embodiments, the video data arrives row by row. For example, the first video data received may correspond to an upper left pixel in an image. Succeeding video data represents the remainder of the pixels in the top row from left to right, and then further rows from top to bottom. When the bottom right of the image is reached, then a complete "frame" of video data has been supplied. The rate at which frames of video data are received is referred to herein as the "frame rate." In typical applications, an input vertical sync (VSYNC) signal is received with the video data and is asserted once per frame. Accordingly, the input VSYNC is periodic at the frame rate.

In operation, video buffer 102 stores one or more rows of video content at 101 and provides commanded luminance values to the laser modules starting when commanded by drive circuit 170 through the video buffer enable signal 171. The commanded luminance values correspond to electrical currents for each of the red, green, and blue laser sources such that the output intensity from the lasers is consistent with the input video content. In some embodiments, this process occurs at output pixel rates in excess of 150 MHz.

The laser beams are then directed onto an ultra-high speed gimbal mounted 2 dimensional bi-axial laser scanning mirror 116. In some embodiments, this bi-axial scanning mirror is fabricated from silicon using MEMS processes. In some embodiments, as described below with reference to FIG. 3, two independent MEMS mirrors are employed in a combined optical system, each responsible for one of the scan axes. One axis of rotation is operated quasi-statically and creates a sawtooth raster trajectory. This axis is also referred to as the slow-scan axis. The second axis of rotation is orthogonal to the first and is operated on a resonant vibrational mode of the scanning mirror. In some embodiments, the MEMS device uses electromagnetic actuation, achieved using a miniature assembly containing the MEMS die and small subassemblies of permanent magnets and an electrical interface, although the various embodiments are not limited in this respect. For example, some embodiments employ electrostatic or piezoelectric actuation. Any type of mirror actuation may be employed without departing from the scope of the present invention. In some embodiments, the slow-scan axis corresponds to the vertical axis and the fast-scan axis corresponds to the horizontal axis, although this is not a limitation of the present invention. For example, a rotation of the projector may result in the fast-scan axis being the vertical axis and the slow-scan axis being the horizontal axis In some embodiments, raster scan 182 is formed by combining a sinusoidal component on the horizontal fast-scan axis and a sawtooth component on the vertical slow-scan axis. In these embodiments, output beam 117 sweeps horizontally (back and forth left-to-right) in a sinusoidal pattern, and sweeps vertically (top-to-bottom) in a sawtooth pattern with the display blanked during flyback (bottom-to-top). FIG. 1 shows the sinusoidal pattern as the beam sweeps vertically top-to-bottom, but does not show the flyback from bottom-to-top. In other embodiments, the vertical sweep is controlled with a triangular wave such that there is no flyback. In still further embodiments, the vertical sweep is sinusoidal or a non-symmetric scanning pattern. The various embodiments of the invention are not limited by the waveforms used to control the vertical and horizontal sweep or the resulting raster pattern.

A mirror drive circuit 170 provides a slow-scan drive signal on node 187 and a fast-scan drive signal on node 189. The fast-scan drive signal on node 189 includes an excitation signal to control the resonant angular motion of scanning mirror 116 on the fast-scan axis, and the slow-scan drive signal includes an excitation signal to cause deflection on the slow-scan axis. The slow-scan and fast-scan drive signals are combined by summer 185 to produce a drive signal used to drive MEMS device 114 on node 173. The resulting mirror deflection on both the fast and slow-scan axes causes output beam 117 to generate a raster scan 182 in field of view 180. In operation, the laser light sources produce light pulses for each output pixel and scanning mirror 116 reflects the light pulses as beam 117 traverses the raster pattern.

Mirror drive circuit 170 receives a feedback FSYNC signal from MEMS device 114 on node 175, and also receives a slow-scan position feedback signal on node 177. The feedback FSYNC signal on node 175 provides information regarding the position of scanning mirror 116 on the fast-scan axis as it oscillates at a resonant frequency. In some embodiments, the feedback FSYNC signal describes the instantaneous angular position of the mirror, and in other embodiments, the feedback signal describes the maximum deflection angle of the mirror, also referred to herein as the amplitude of the feedback signal. The slow-scan position feedback signal on node 177 provides information regarding the position of scanning mirror 116 on the slow-scan axis. In some embodiments, the slow-scan position feedback signal is used to phase lock movement on the slow-scan axis to the period of the input VSYNC signal received on node 103. In these embodiments, the frequency of movement on the slow-scan axis is dictated by a received sync signal (in this case, the input VSYNC).

In some embodiments, MEMS device 114 includes one or more analog-to-digital converters to digitize sensed position information. In these embodiments, either or both of the feedback FSYNC signal and the slow-scan position feedback signal are digital representations of the mirror position on the two axes. In other embodiments, the feedback signals are analog signals, and drive circuit 170 includes one or more analog-to-digital converters to digitize the feedback signals as appropriate.

In operation, drive circuit 170 excites resonant motion of scanning mirror 116 such that the amplitude of the scanned beam is held constant. This provides for a constant maximum angular deflection on the fast-scan axis as shown in raster scan 182. Drive circuit 170 receives an input VSYNC signal on node 103. In some embodiments, the input VSYNC signal is received from the source of video data that is received on node 101. In these embodiments, the input VSYNC signal is periodic with a period corresponding to the frame rate of the video data on node 101.

As described further below, drive circuit 170 phase locks mirror movement on the slow-scan axis to the input VSYNC signal, and drives mirror movement on the fast-scan axis at a resonant frequency of mirror 116. This results in the period of movement on the slow-scan axis being a non-integer multiple of the period on the fast-scan axis. The non-integer multiple may change during operation as the input VSYNC changes, the resonant frequency of the mirror changes, or both. Drive circuit 170 includes a slow-scan position offset circuit to add a position offset to the slow-scan drive signal that compensates for the non-integer period relationship, and causes the fast-scan trajectory to scan substantially identical raster scan trajectories in subsequent frames.

Drive circuit 170 may be implemented in hardware, a programmable processor, or in any combination. For example, in some embodiments, drive circuit 170 is implemented in an application specific integrated circuit (ASIC). Further, in some embodiments, some of the faster data path control is performed in an ASIC and overall control is provided by a software programmable microprocessor. Examples of drive circuit implementations are described further below.

Although red, green, and blue laser light sources are shown in FIG. 1, the various embodiments of the invention are not limited by the wavelength of light emitted by the laser light sources. For example, in some embodiments, non-visible light (e.g., infrared light) is emitted instead of, or in addition to, visible light.

Figure 2:
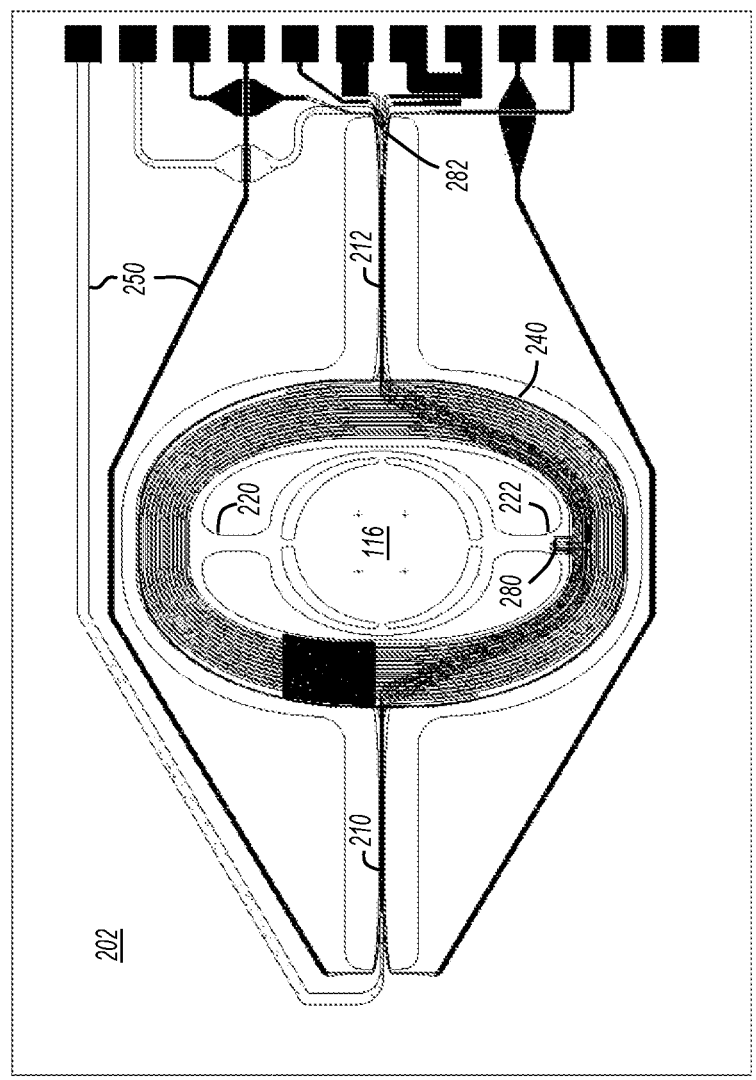
FIG. 2 shows a plan view of a microelectromechanical system (MEMS) device with a scanning mirror in accordance with various embodiments of the present invention.

FIG. 2 shows a plan view of a microelectromechanical system (MEMS) device with a scanning mirror. MEMS device 114 includes fixed platform 202, scanning platform 240, and scanning mirror 116. Scanning platform 240 is coupled to fixed platform 202 by flexures 210 and 212, and scanning mirror 116 is coupled to scanning platform 240 by flexures 220 and 222. Scanning platform 240 has a drive coil connected to drive lines 250, which are driven by a drive signal provided on node 173 from summer 185 (FIG. 1). The drive signal includes an excitation signal to excite resonant motion of scanning mirror 116 on the fast-scan axis, and also includes a slow-scan drive signal to cause non-resonant motion of scanning platform 240 on the slow-scan axis. Current driven into drive lines 250 produces a current in the drive coil.

In operation, an external magnetic field source (not shown) imposes a magnetic field on the drive coil. The magnetic field imposed on the drive coil by the external magnetic field source has a component in the plane of the coil, and is oriented non-orthogonally with respect to the two drive axes. The in-plane current in the coil windings interacts with the in-plane magnetic field to produce out-of-plane Lorentz forces on the conductors. Since the drive current forms a loop on scanning platform 240, the current reverses sign across the scan axes. This means the Lorentz forces also reverse sign across the scan axes, resulting in a torque in the plane of and normal to the magnetic field. This combined torque produces responses in the two scan directions depending on the frequency content of the torque.

The long axis of flexures 210 and 212 form a pivot axis. Flexures 210 and 212 are flexible members that undergo a torsional flexure, thereby allowing scanning platform 240 to rotate on the pivot axis and have an angular displacement relative to fixed platform 202. Flexures 210 and 212 are not limited to torsional embodiments as shown in FIG. 2. For example, in some embodiments, flexures 210 and 212 take on other shapes such as arcs, "S" shapes, or other serpentine shapes. The term "flexure" as used herein refers to any flexible member coupling a scanning platform to another platform (scanning or fixed), and capable of movement that allows the scanning platform to have an angular displacement with respect to the other platform.

Scanning mirror 116 pivots on a first axis formed by flexures 220 and 222, and pivots on a second axis formed by flexures 210 and 212. The first axis is referred to herein as the horizontal axis or fast-scan axis, and the second axis is referred to herein as the vertical axis or slow-scan axis. The distinction between vertical and horizontal is somewhat arbitrary, since a rotation of the projection apparatus will cause a rotation of the two axes. Accordingly, the various embodiments of the present invention are not to be limited by the terms "horizontal" and "vertical."

In some embodiments, scanning mirror 116 scans at a mechanically resonant frequency on the fast-scan axis resulting in a sinusoidal horizontal sweep. Further, in some embodiments, scanning mirror 116 scans at a non-resonant frequency on the slow-scan axis, so the vertical scan frequency can be controlled independently.

MEMS device 114 also incorporates one or more integrated piezoresistive position sensors. Piezoresistive sensor 280 produces a voltage that represents the displacement of mirror 116 with respect to scanning platform 240, and this voltage is provided as the feedback FSYNC signal on node 175 (FIG. 1). Piezoresistive sensor 282 produces a voltage that represents the displacement of scanning platform 240 with respect to fixed platform 202, and this voltage is provided as the slow-scan position feedback signal on node 177 (FIG. 1). As shown in FIG. 2, in some embodiments, position sensors are provided on both scan axes, although this is not a limitation of the present invention. For example, in some embodiments, MEMS device 114 includes a position sensor on only one axis. In some embodiments, one or more analog-to-digital converters are included to digitize the voltages produced by the piezoresistive position sensors. In these embodiments, one or both of the FSYNC signal and slow-scan position feedback signal are provided as streams of digital data.

The particular MEMS device embodiment shown in FIG. 2 is provided as an example, and the various embodiments of the invention are not limited to this specific implementation. For example, any combination of scanning mirrors capable of sweeping in two dimensions to reflect a light beam in a raster pattern may be incorporated without departing from the scope of the present invention. Also for example, any combination of scanning mirrors (e.g., two mirrors: one for each axis) may be utilized to reflect a light beam in a raster pattern. Further, any type of mirror drive mechanism may be utilized without departing from the scope of the present invention. For example, although MEMS device 114 uses a drive coil on a moving platform with a static magnetic field, other embodiments may include a magnet on a moving platform with drive coil on a fixed platform. Further, the mirror drive mechanism may include an electrostatic and/or a piezoelectric drive mechanism.

Figure 3:
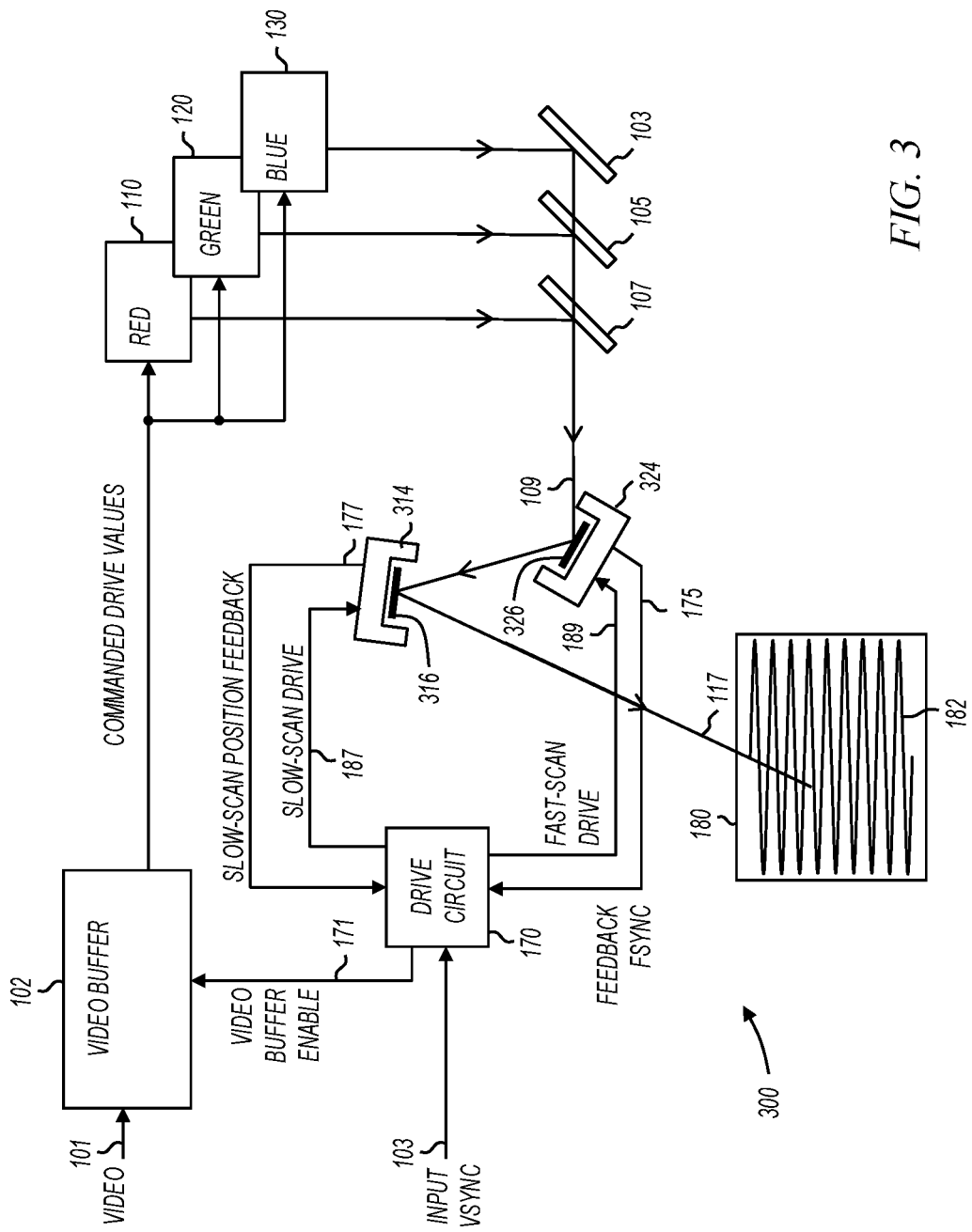
FIG. 3 shows a scanning laser projector in accordance with various embodiments of the present invention.

FIG. 3 shows a scanning laser projector in accordance with various embodiments of the present invention. Laser projector 300 is similar to laser projector 100 (FIG. 1) with the exception that two scanning mirrors are present instead of one. In some embodiments, a first MEMS device 324 includes a scanning mirror 326 configured to deflect along one axis and a second MEMS device 314 includes a scanning mirror 316 configured to deflect along a second axis that is largely perpendicular to the first axis. Furthermore, in some embodiments, the first mirror is used for fast-scan motion, while the second mirror is used for slow-scan motion. In some embodiments, the fast-scan motion comprises resonant sinusoidal motion while the slow-scan motion comprises non-resonant quasi-static controlled motion.

Drive circuit 170 provides a fast-scan drive signal to MEMS device 324 on node 189 to excite motion of mirror 326, and receives a feedback sync signal FSYNC on node 175. Drive circuit 170 also provides a slow-scan drive signal to MEMS device 314 on node 187 to excite motion of mirror 316 and receives a slow-scan position feedback signal on node 177.

Figure 4:
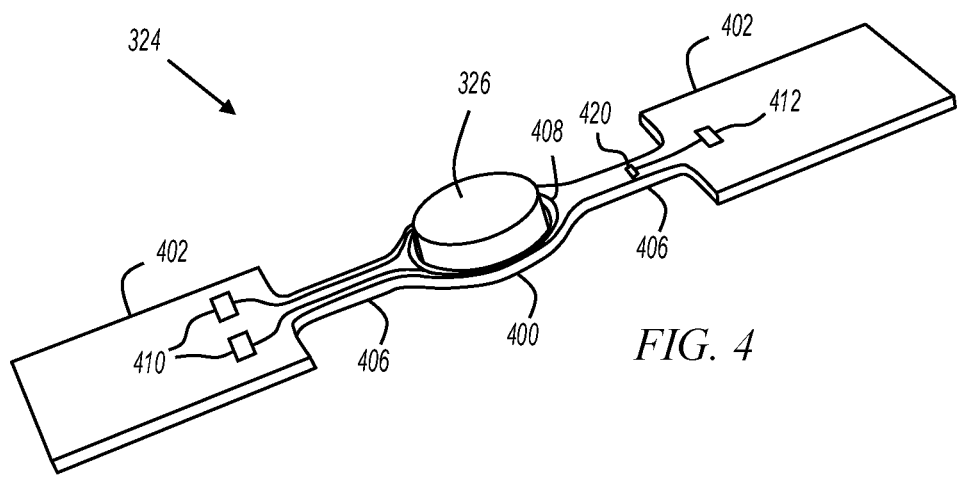
FIG. 4 shows a perspective view of a MEMS device with a scanning mirror in accordance with various embodiments of the present invention.

FIG. 4 shows a perspective view of a MEMS device with a scanning mirror in accordance with various embodiments of the present invention. MEMS device 324 includes fixed platforms 402, scanning platform 400, and scanning mirror 326. Scanning platform 400 is coupled to fixed platforms 402 by flexures 406. Scanning platform 400 has a drive coil 408 connected to contacts 410, which are driven by a fast-scan drive signal provided on node 189 from drive circuit 170 (FIG. 3).

The axis of flexures 406 forms a pivot axis. Flexures 406 are flexible members that undergo a torsional flexure, thereby allowing scanning platform 400 to rotate on the pivot axis and have an angular displacement relative to fixed platforms 402. Flexures 406 are not limited to torsional embodiments as shown in FIG. 4. For example, in some embodiments, flexures 406 take on other shapes such as arcs, "S" shapes, or other serpentine shapes.

In operation, an external magnetic field source (not shown) imposes a magnetic field on the drive coil. The magnetic field imposed on the drive coil by the external magnetic field source has a component in the plane of the coil. The in-plane current in the coil windings interacts with the in-plane magnetic field to produce out-of-plane Lorentz forces on the conductors. Since the drive current forms a loop on scanning platform 400, the current reverses sign across the scan axis. This means the Lorentz forces also reverse sign across the scan axis, resulting in a torque in the plane of and normal to the magnetic field. This combined torque produces a response on the scan axis depending on the frequency content of the torque. In some embodiments, scanning platform 400 and mirror 326 scan at a mechanically resonant frequency on the fast-scan axis resulting in a sinusoidal sweep.

MEMS device 324 also incorporates one or more integrated piezoresistive position sensors. Piezoresistive sensor 420 produces a voltage that represents the displacement of scanning platform 400 and mirror 326 with respect to fixed platforms 402. Piezoresistive sensor 420 is coupled to contact 412. The voltage on contact 412 is provided as the feedback FSYNC signal on node 175 (FIG. 3). In some embodiments, the FSYNC signal is provided as an analog signal. In other embodiments, the FSYNC signal is digitized using a comparator (not shown) or an analog-to-digital converter (not shown) such that a digital feedback signal is provided on node 175 (FIG. 3).

Much of MEMS device 324 can be fabricated from a single common substrate using MEMS techniques. For example, the fixed platforms 402, the scanning platform 400 and the two flexures 406 can all be formed from the same substrate. Additionally, in some embodiments, the drive coil 408 and contacts 410 and 412 can also be formed with any suitable MEMS technique. For example, the drive coil 408 and contacts 410 and 412 can be formed by the selective deposition and patterning of conductive materials on the substrate.

Figures 5A, 5B:
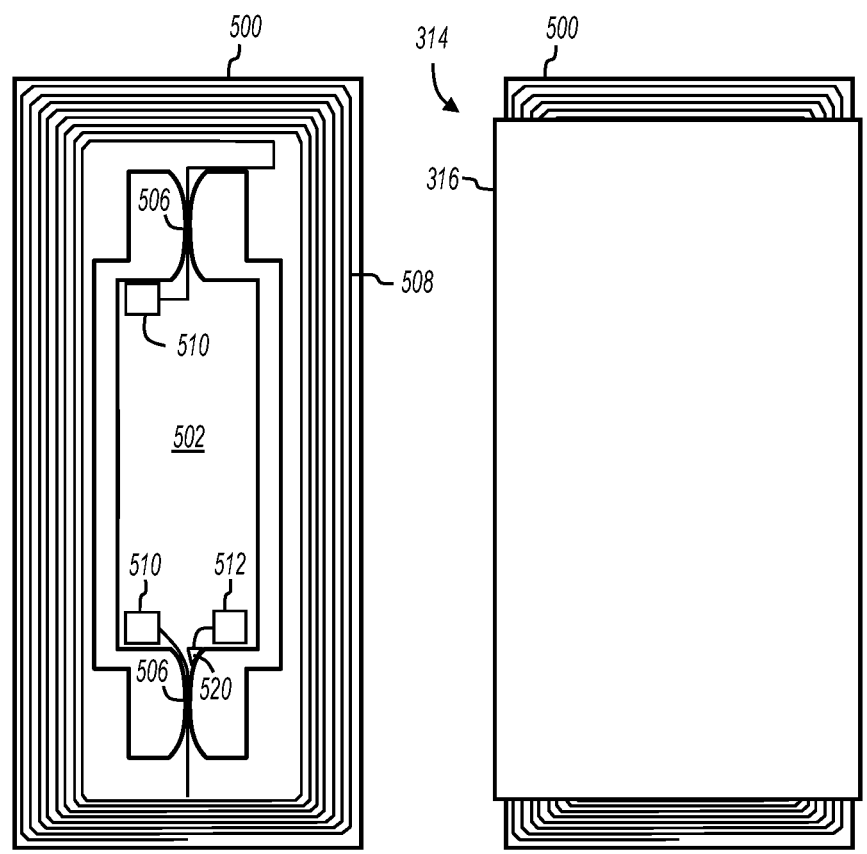
FIGS. 5A and 5B show plan views of a MEMS device with a scanning mirror in accordance with various embodiments of the present invention.

FIGS. 5A and 5B show plan views of a MEMS device with a scanning mirror in accordance with various embodiments of the present invention. MEMS device 314 includes a stationary mount portion 502, a movable portion 500, two flexures 506, coil traces 508, and contacts 510. In operation, the movable portion 500 facilitates the motion of the attached mirror 316 to facilitate scanning in a laser scanning device.

The stationary mount portion 502 is located in a central portion of the MEMS device 314. The stationary mount portion 502 is configured to be mounted to a die carrier in a scanner assembly (not shown in FIG. 5) or other suitable device.

The movable portion 500 substantially surrounds the stationary mount portion 502 and is coupled to the mirror 316 through attachment structures (not shown). In some embodiments, the attachment structures serve to offset the mirror 316 away from the movable portion 500. This offset of the mirror 316 away from the movable 500 allows the mirror 316 to rotate with a defined angle range without impacting the stationary mount portion 502.

The movable portion 500 includes coil traces 508 while the stationary mount portion 502 includes various contacts 510 and 512. The coil traces 508 are configured to interact with applied magnetic fields and generate non-resonant or quasi-static motion. In some embodiments, coil traces 508 circumscribe the stationary mount portion 502 so that the stationary mount portion 502 is located substantially in the center of the coil traces 508; however, this is not a limitation of the present invention. In some embodiments, separate and independent coil traces on either side of the stationary mount portion 502 are used. In further embodiments, coil traces are formed on the attachment structures (not shown).

Contacts 510 and 512 provide electrical connections between the movable portion 500 and stationary portion 502. Contacts 510 provide electrical connections to coil traces 508, and contact 512 provides an electrical connection to position sensor 520.

The two flexures 506 are located on opposing sides of the stationary mount portion 502 and extend outwardly from the stationary mount portion 502 to the movable portion 500 to form a pivot axis. So configured, the two flexures 506 flexibly couple the stationary mount portion 502 to the movable portion 500 to facilitate movement of the movable portion 500 with respect to the stationary mount portion 502 along the pivot axis. Specifically, the two flexures 506 allow the movable portion 500 and the mirror 316 to rotate about the pivot axis. This rotation of the mirror 316 facilitates the use of the mirror 316 to reflect a laser beam into a scan pattern.

During operation, drive circuit 170 (FIG. 3) provides a slow-scan drive signal to the coil trace 508 through contacts 510. The applied slow-scan drive signal creates electromagnetic interactions between the coil trace 508 and an applied magnetic field, and those interactions excite motion of the movable portion 500 and the attached mirror 316. The resulting motion of mirror 316 can be configured to reflect laser light into a pattern of scan lines, and thus can facilitate laser image projection and/or laser depth sensing.

MEMS device 314 also incorporates one or more integrated piezoresistive position sensors 520. Piezoresistive sensor 520 produces a voltage that represents the displacement of mirror 316 with respect to stationary portion 502, and this voltage is provided as the slow-scan position feedback signal on node 177 (FIG. 3). In some embodiments, the slow-scan position feedback signal is provided as an analog signal. In other embodiments, the slow-scan position feedback signal is digitized using an analog-to-digital converter (not shown) such that a digital feedback signal is provided on node 177 (FIG. 3).

Much of MEMS device 314 can be fabricated from a single common substrate using MEMS techniques. Thus, the stationary mount portion 502, the movable portion 500 and the two flexures 506 can all be formed from the same substrate. Additionally, in some embodiments attachment structures can also be formed from the same substrate, while in other embodiments the attachment structures are formed separately or as part of the mirror 316. The coil traces 508 and contacts 510 and 512 can also be formed with any suitable MEMS technique. For example, the coil traces 508 and contacts 510 and 512 can be formed by the selective deposition and patterning of conductive materials on the substrate.

Figure 6:
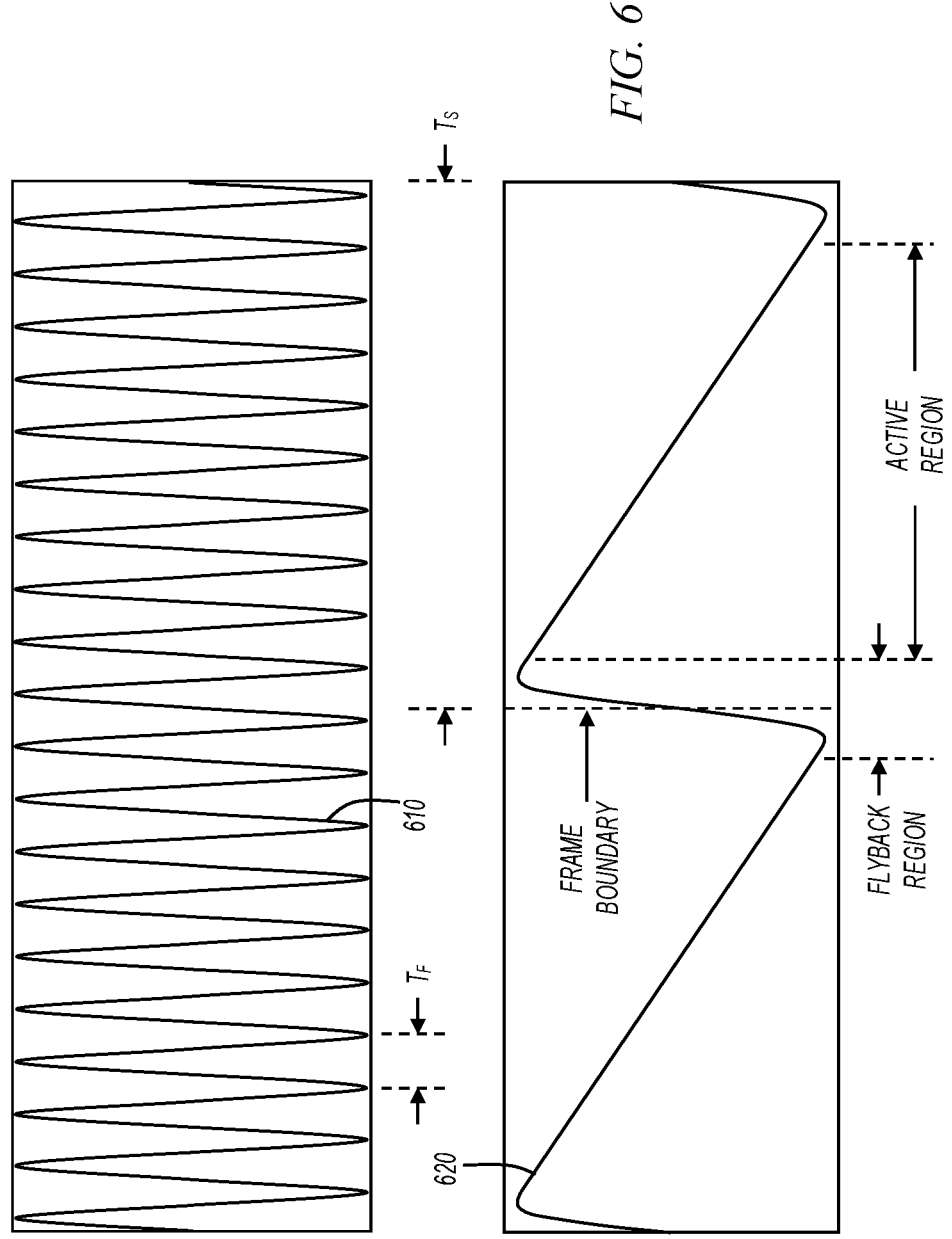
FIG. 6 shows a plot of mirror movement on the fast-scan axis and the slow-scan axis in accordance with various embodiments of the present invention.

FIG. 6 shows a plot of mirror movement on the fast-scan axis and the slow-scan axis in accordance with various embodiments of the present invention. The top plot in FIG. 6 shows resonant mirror movement on the fast scan axis. Waveform 610 shows the mirror movement on the fast-scan axis at a resonant frequency with a period $T_F$. In some embodiments, this represents resonant motion of a biaxial mirror on a single axis (FIG. 1), and in other embodiments, this represents resonant motion of a single-axis mirror (FIG. 3).

The resonant frequency on the fast-scan axis is a physical property of the mirror. This resonant mode of the scanning mirror is highly resonant, with a Q generally in excess of 800. Accordingly, the fast-scan frequency cannot be arbitrarily changed without consuming considerable additional power. Various embodiments of the present invention excite the mirror to oscillate at the resonant frequency of the mirror, and the fast-scan resonant frequency then dictates the line rate of the scan (twice per cycle), which varies across units as a function of material properties and manufacturing tolerances.

The bottom plot in FIG. 6 shows non-resonant mirror movement on the slow-scan axis. Waveform 620 shows the mirror movement on the slow-scan axis having a period $T_S$. In some embodiments, this represents non-resonant motion of a biaxial mirror on a single axis (FIG. 1), and in other embodiments, this represents non-resonant motion of a single-axis mirror (FIG. 3).

In some embodiments, the frequency of movement on the slow-scan axis is deliberately chosen to be far from a resonant mode of the mirror, so that the period $T_S$ of movement on the slow-scan axis can be set more or less arbitrarily. For example, in some embodiments, the frequency of movement on the slow-scan axis is set to approximately 60 Hz, which is close to a common video frame rate, although this is not a limitation of the present invention. For example, in some embodiments, the frequency of movement on the slow scan axis is 90 Hz, 120 Hz, or other frequency.

Each period of movement on the slow-scan axis is divided into two regions: the active region, and the flyback region. In scanning laser projector embodiments, the active region may also be referred to as the active video region. During scanning in the active region, the mirror movement on the slow-scan axis follows a reference trajectory which is often substantially linear. In video projection embodiments, displayed pixels are painted during the active region. In other embodiments, projected content for spatial sensing is deposited solely or in addition to video content. During scanning in the flyback region, the movement on the slow-scan axis "flies back" to the start of the active region to ready for another frame.

In some embodiments, the total number of fast scan cycles in one slow-scan period is larger than the number of usable video lines in the active region. For example, some embodiments may include 720 lines of video, or 360 fast-scan cycles, plus some number of fast-scan cycles where the vertical scan no longer follows the active region reference scan trajectory, plus some number of fast-scan cycles for flyback. In these embodiments, there may be 460 fast-scan cycles, or 920 lines. The number of fast-scan cycles per frame increase as the fast-scan frequency increases, given a fixed frame rate. In some embodiments, those extra scan lines are not used to display video, but are used for flyback.

One possible way to control movement on the slow-scan axis is to scan it at a rate that is related to the fast-scan frequency by an integer ratio. For example, the slow-scan period $T_S$ may be chosen to be an integer multiple of the fast-scan period $T_F$. This is referred to herein as the "integer locked" mode of operation. When operating in integer locked mode, any given numbered scan line will trace the same position in the vertical plane on every frame. This somewhat simplifies the control of mirror movement, but results in the display frame rate (which is slaved to fast-scan) being different than the source video frame rate. Mitigation of this rate transition issue is typically handled by multi-frame buffering and/or occasional frame skipping/repetition. This leads to high latency and/or an undesirable (though not necessarily visually significant) lack of accurate video presentation.

For example, if the input video frame rate is 60 Hz and the slow-scan frequency is 60.04 Hz, a frame will need to be duplicated every 25 seconds, which means the frame buffer must be large enough to hold both the current frame and the next frame (also referred to herein as "double-buffering"). This results in additional buffering memory in video buffer 102 (FIGS. 1, 3).

In addition to buffering for rate transition management, further video data buffering may be needed to manage changes in display frame rates when operating in integer locked mode. For example, as the fast-scan frequency changes over time and temperature, the display frame rate will also change over time and temperature. Accordingly, the display frame rate may be unique to a particular scanning mirror at a particular moment in time.

Various embodiments of the present invention do not operate in integer locked mode. Instead, the slow-scan is unlocked from the fast-scan, and the slow-scan period $T_S$ is allowed to be a non-integer multiple of the fast-scan period $T_F$. This is referred to herein as operating in "non-integer locked" mode. In some non-integer locked mode embodiments, the slow-scan movement is phase locked to a received sync signal such as the input VSYNC signal on node 103 (FIG. 1). In these embodiments, the scanning mirror slow-scan frequency matches the incoming video frame rate, which reduces video buffering requirements as compared to operation in integer locked mode.

Non-integer locked modes of operation may offer advantages over integer locked modes of operation. For example, video can be displayed at arbitrary frame rates in non-integer locked modes of operation, and those frame rates can be matched to an external sync signal, thereby matching the display frame rate to the video frame rate over time and temperature. Also for example, video buffering requirements may be reduced because it isn't necessary to double buffer video if the frame rate is matched. Further, non-integer locked modes of operation can lower the latency between when video is presented to the system and when it is actually consumed. In general, the maximum latency is a function of the ratio between input video and scanned mirror active periods. Latency can be driven to near zero by matching the input video active period to the scanned mirror active period. This is described in more detail below with reference to FIGS. 19 and 20.

The example relationship between fast-scan movement and slow-scan movement shown in FIG. 6 represents a non-integer locked mode of operation. Two slow-scan frames are shown, and each encompasses a non-integer number of fast-scan cycles.

Figures 7, 8:
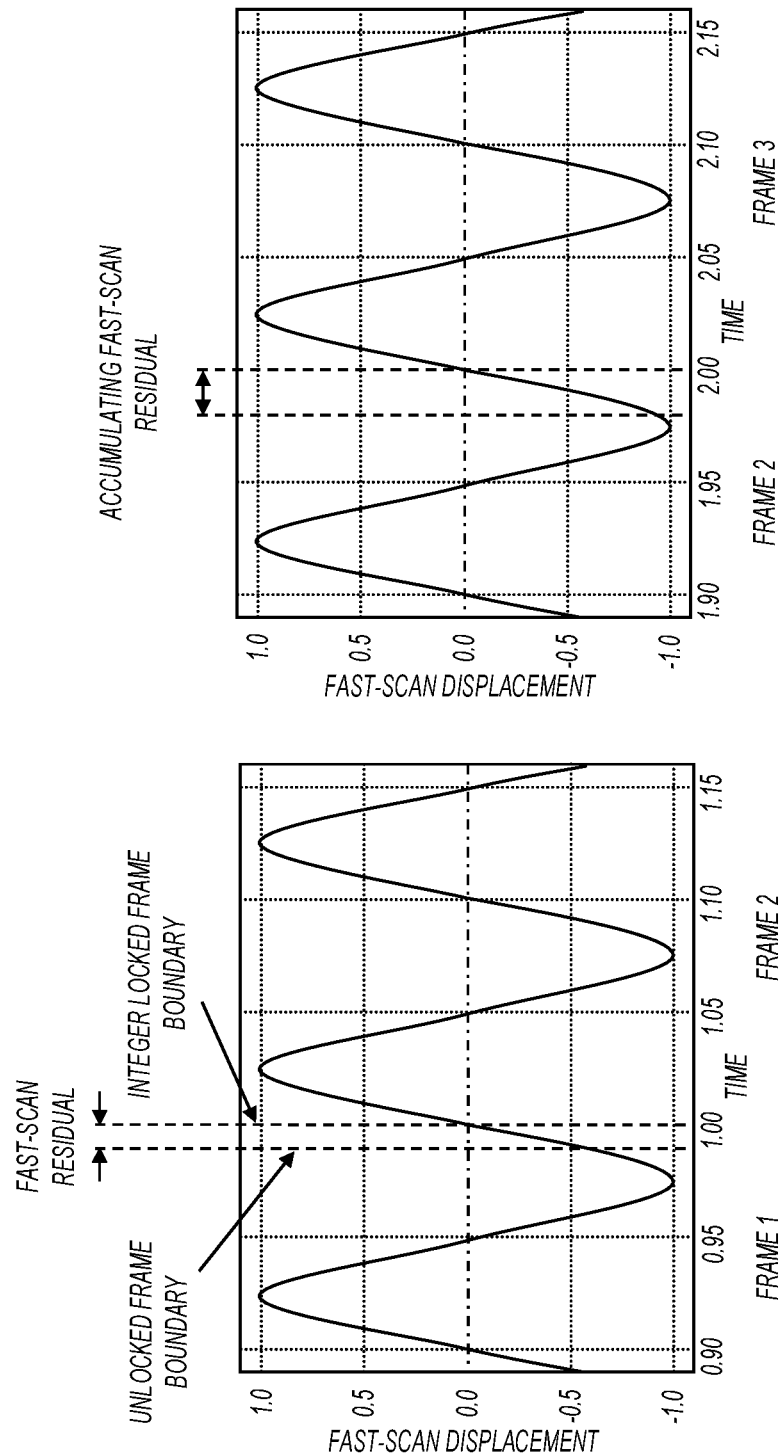
FIGS. 7 and 8 show accumulating fast scan residual in accordance with various embodiments of the present invention.

FIGS. 7 and 8 show accumulating fast-scan residual in accordance with various embodiments of the present invention. Non-integer locked modes of operation result in a partial line (partial fast-scan cycle) at the end of most frames. The phase of this partial fast-scan cycle is referred to herein as "fast-scan residual." The fast-scan residual changes from frame to frame, and has the effect of moving the vertical position of a subsequent frame's lines up or down, depending on if the residual is greater than or less than one half of a fast-scan cycle.

FIG. 7 shows the fast-scan residual at the end of a first slow-scan period, and FIG. 8 shows how the fast-scan residual accumulates after two slow-scan periods. As the fast-scan residual accumulates over a number of slow-scan periods, the fast-scan trajectory will appear to continuously move up or down on the slow-scan axis.

Figure 10:
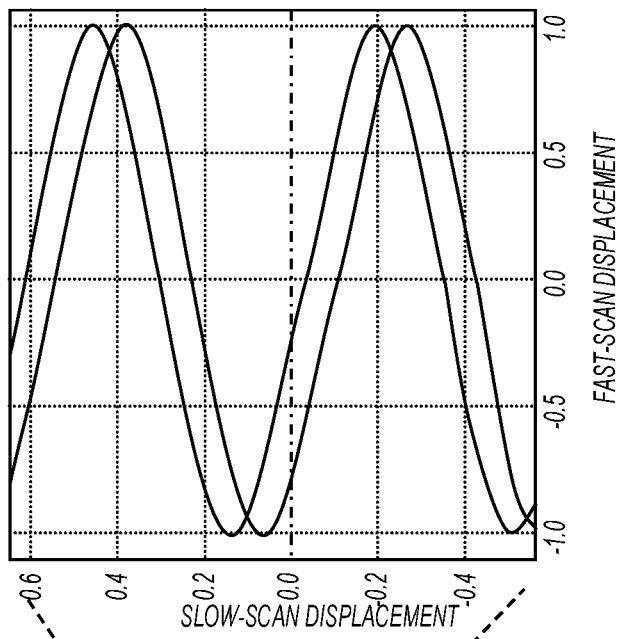
FIGS. 9 and 10 show the effects of non-corrected fast scan residual.
Figure 9:
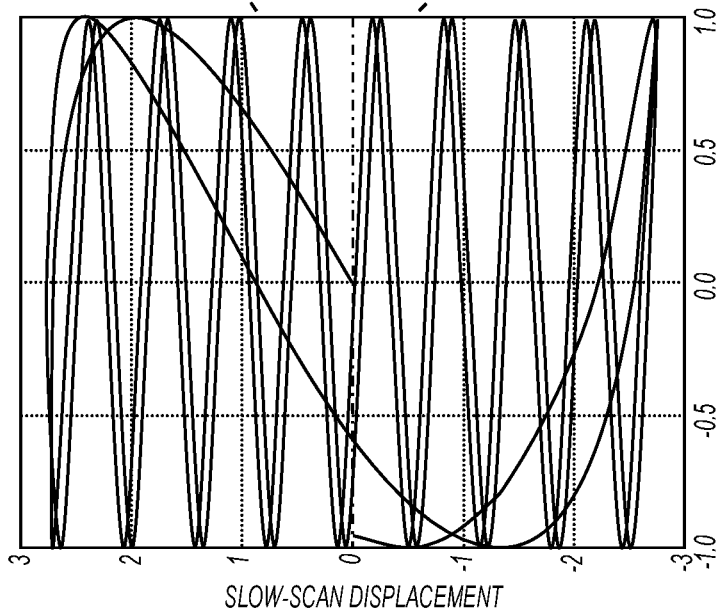

FIGS. 9 and 10 show the effects of non-corrected fast-scan residual. As shown in FIG. 9, an accumulating fast-scan residual causes subsequent raster scan trajectories in the active region to move up or down on the slow-scan axis. Accordingly, the non-integer relationship between the fast-scan and slow-scan periods results in the resonant movement on the fast-scan axis scanning different raster scan trajectories during subsequent slow-scan periods. FIG. 10 is a close up view of a portion of the raster scan trajectory that clearly shows a vertical displacement between the subsequent scans due to the fast-scan residual.

Eventually, the difference is equal to or greater than one line (one half fast-scan cycle), at which point the entire image will shift up by one line with reversed scan direction. This phenomenon will occur again as the residual becomes equal to or greater than one full fast-scan cycle (two lines), and so on. Various embodiments of the present invention track the accumulated fast-scan residual as modulo one fast-scan cycle and then add a position offset on the slow-scan axis that corrects for the accumulated fast-scan residual. This is described in more detail below with reference to later figures.

FIG. 11 shows mirror movement with a position offset on the slow scan axis in accordance with various embodiments of the present invention. As shown in FIG. 11, in some embodiments, the fast-scan residual is determined at the end of the active region of the slow-scan period, and a position offset is added to the slow-scan drive signal during the flyback region. The position offset is modified as necessary every period of the slow-scan mirror movement to shift the position of the mirror on the slow-scan axis an amount equal and opposite to the current fast-scan residual. This shifts the raster scan pattern up or down such that the scan trajectory traces a substantially identical trajectory from one frame to the next. In embodiments represented by FIG. 11, the position offset is added during the flyback region of the slow-scan movement. In some embodiments, the position offset is added elsewhere in the slow-scan movement.

Figures 12, 13:
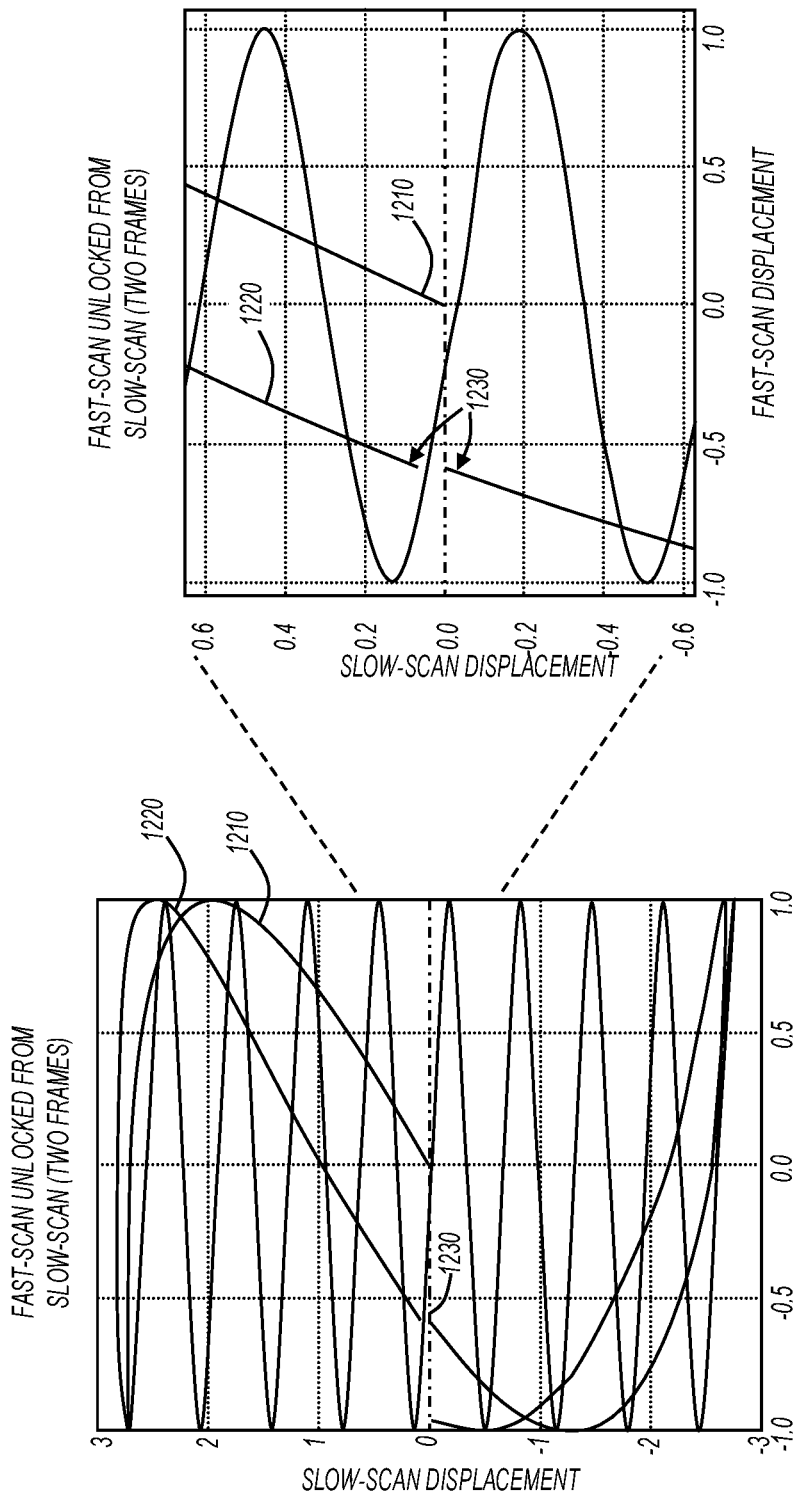
FIGS. 12 and 13 show the effects of a position offset correcting for fast-scan residual in accordance with various embodiments of the present invention.

FIGS. 12 and 13 show the effects of a position offset correcting for fast-scan residual in accordance with various embodiments of the present invention. A first slow-scan trajectory is shown at 1210, and a second slow-scan trajectory is shown at 1220. During the flyback region, a position offset is added at 1230. As a result of the position offset, the two scans trace a substantially identical trajectory during the active region.

As described further below, various embodiments include circuits to measure the accumulated fast-scan residual, and to add a position offset on the slow-scan axis to compensate for the shift on the slow-scan axis that results from the uncorrected fast-scan residual.

FIGS. 12 and 13 show a position offset being used to cause subsequent scans on the slow-scan axis to scan substantially identical trajectories; however this is not a limitation of the present invention. In some embodiments, the position offset is used to inject a position offset on the slow-scan axis that does not result in substantially identical scan trajectory in subsequent frames. For example, a position offset may be computed that causes subsequent slow-scan periods to be offset by a fraction of one fast-scan cycle to create an interleaved video pattern. In some embodiments this may be advantageously utilized to increase apparent video resolution.

Figure 14:
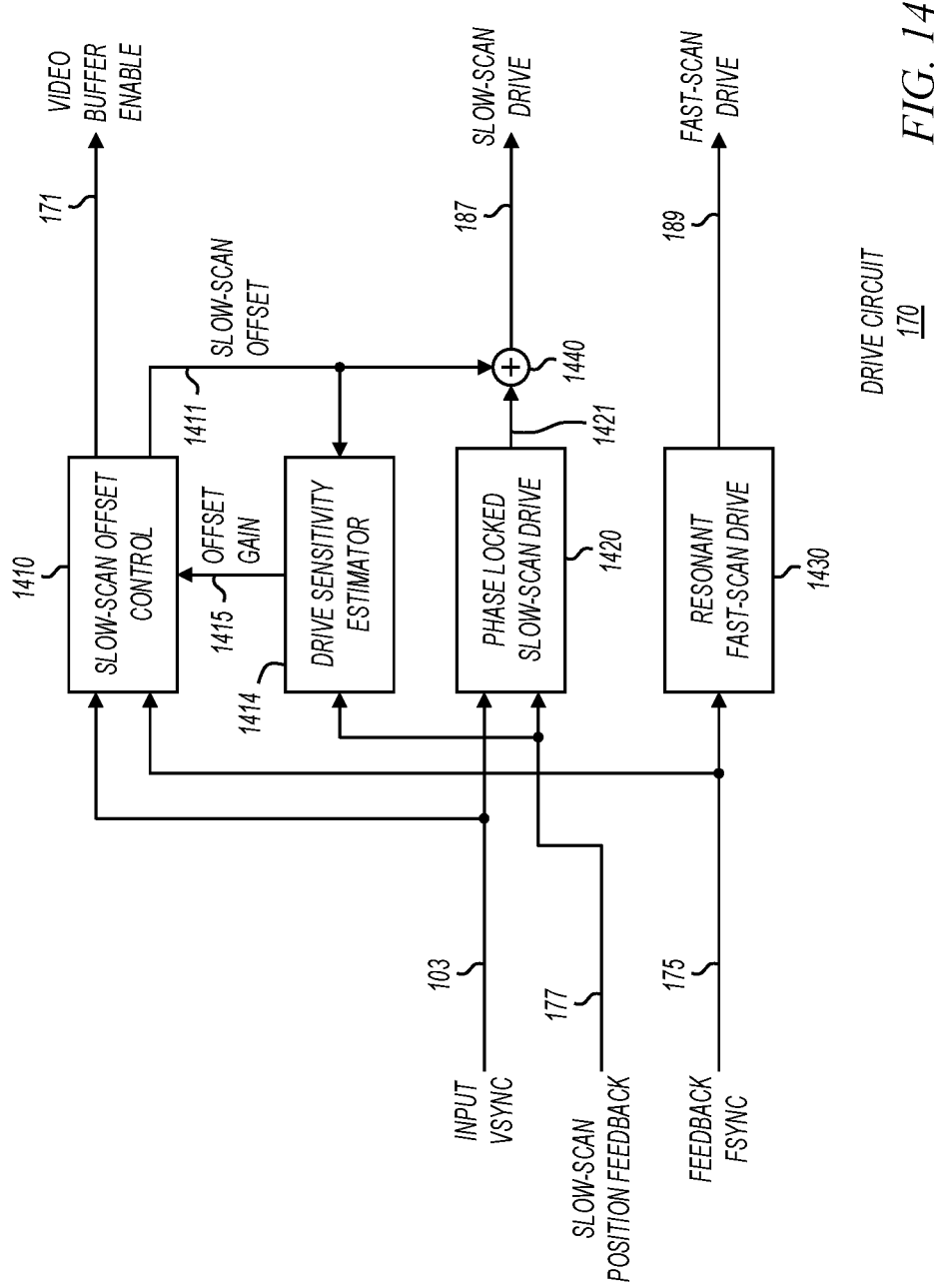
FIG. 14 shows a block diagram of a drive circuit in accordance with various embodiments of the present invention.

FIG. 14 shows a block diagram of a drive circuit in accordance with various embodiments of the present invention. Drive circuit 170 includes phase locked slow-scan drive circuit 1420, resonant fast-scan drive circuit 1430, slow-scan offset control circuit 1410, drive sensitivity estimation circuit 1414, and summer 1440. Phase locked slow-scan drive circuit 1420 produces a control signal on node 1421, and resonant fast-scan drive circuit 1430 produces the fast-scan drive signal on node 189.

Resonant fast-scan drive circuit 1430 provides periodic excitations to cause the scanning mirror to oscillate at the mechanical resonant frequency on the fast-scan axis. Resonant fast scan drive circuit 1430 receives the feedback FSYNC signal on node 175 as a feedback signal. Resonant fast scan drive circuit 1430 includes a control circuit that may alter the timing or amplitude of its output signal as a function of the feedback FSYNC signal.

Phase locked slow-scan drive circuit 1420 provides a control signal on node 1421 to cause the scanning mirror to sweep on the slow-scan axis. The control signal on node 1421 works in combination with the mirror dynamics to result in the desired mirror movement on the slow-scan axis. Phase locked slow-scan drive circuit 1420 receives the input VSYNC on node 103 and the slow-scan position feedback signal from the scanning mirror on node 177. Phase locked slow-scan drive circuit 1420 phase locks the control signal on node 1421 to the input VSYNC to lock the slow-scan sweep of either scanning mirror 116 (FIGS. 1, 2) or scanning mirror 316 (FIGS. 3, 5) to the incoming video frame rate.

Phase locked slow-scan drive circuit 1420 and resonant fast-scan drive circuit 1430 may be implemented in hardware, a programmable processor, or in any combination. For example, in some embodiments, phase locked slow-scan drive circuit 1420 and resonant fast-scan drive circuit 1430 are implemented with phase comparators, frequency multipliers and/or dividers, numerically controlled oscillators, loop filters, and the like. Also for example, phase locked slow-scan drive circuit 1420 and resonant fast-scan drive circuit 1430 may be implemented in an application specific integrated circuit (ASIC). Further, in some embodiments, some of the faster data path control is performed in an ASIC and overall control is provided by a software programmable microprocessor. The manner in which these circuits are implemented is not a limitation of the present invention.

Drive circuit 170 also includes slow-scan offset control circuit 1410. Slow-scan offset control circuit 1410 receives the input VSYNC on node 103 and the feedback FSYNC on node 175 and determines and accumulates the fast-scan residual. Based on the accumulated fast-scan residual, slow-scan offset control circuit 1410 produces a slow-scan position offset value on node 1411 that is summed with the control signal on node 1421 to create the slow-scan drive signal on node 187.

Drive sensitivity estimation circuit 1414 receives the slow-scan position feedback signal and the slow-scan offset and determines an offset gain value to provide to slow-scan offset control 1410 on node 1415. Slow-scan offset control circuit 1410 applies the offset gain to the slow-scan offset value. The operation of drive sensitivity estimation circuit 1414 is described in more detail below with reference to later figures.

Slow-scan offset control circuit 1410 also produces a video buffer enable signal on node 171. The timing of the video buffer enable signal is modified as a function of the slow-scan offset to ensure that the timing of pixels matches the timing changes that correspond to the position offset. Examples of video buffer enable timing are described further below.

Figure 15:
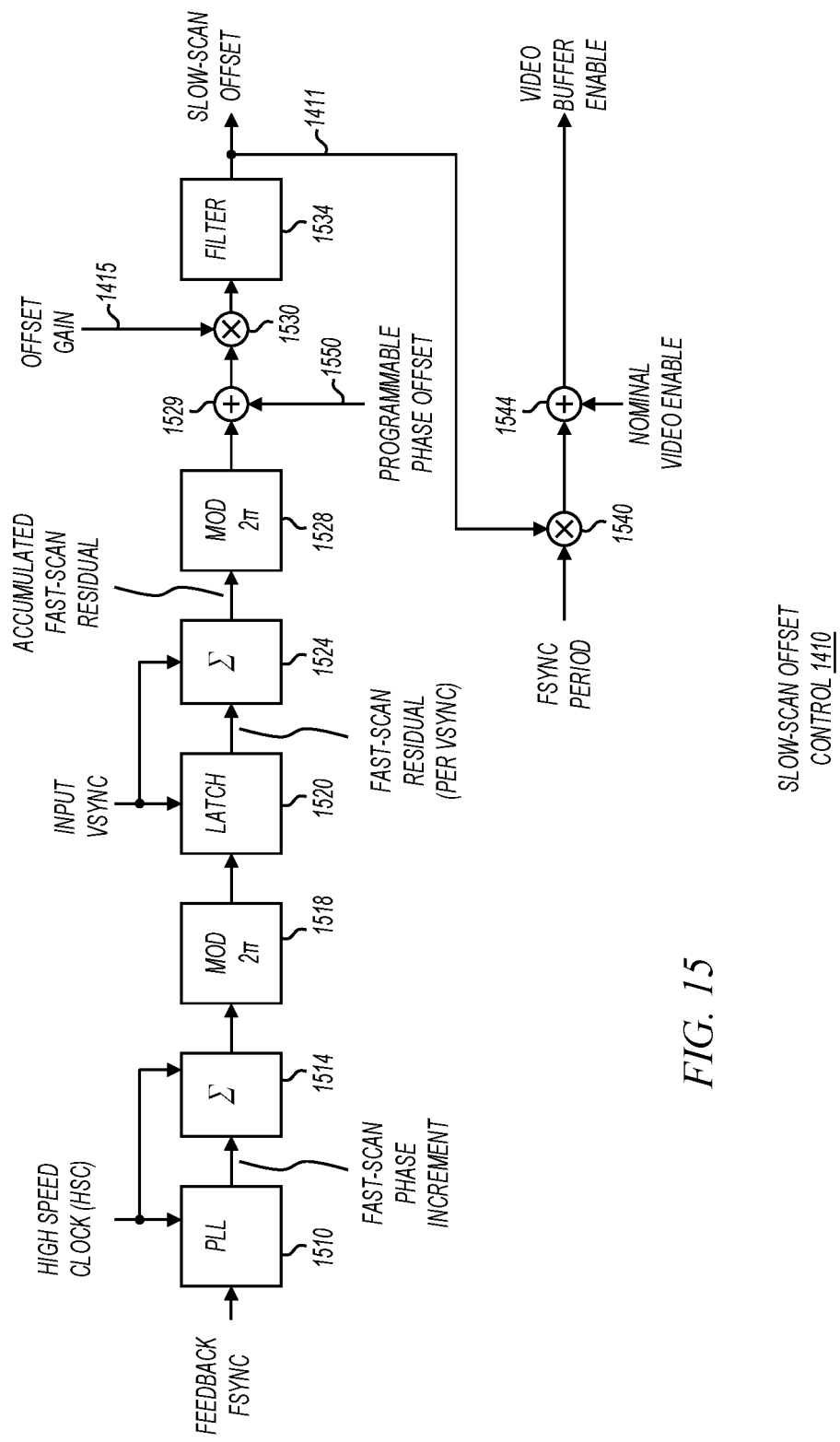
FIG. 15 shows a slow-scan offset control circuit in accordance with various embodiments of the present invention.

FIG. 15 shows a slow-scan offset control circuit in accordance with various embodiments of the present invention. Slow-scan offset control circuit 1410 includes phase locked loop (PLL) 1510, phase accumulator 1514, modulo operator 1518, latch 1520, fast-scan residual accumulator 1524, modulo operator 1528, summer 1529, multiplier 1530, and filter 1534 used as a residual phase tracking circuit to track a residual phase and to determine the slow-scan position offset. Slow-scan offset control circuit 1410 also includes multiplier 1540 and summer 1544 used to produce the video buffer enable signal.

In operation, PLL 1510 receives the feedback FSYNC signal and produces a fast-scan phase increment that mathematically represents the change in fast-scan phase for every period of a high speed clock (HSC). The HSC is a clock signal that is higher in frequency than the fast-scan frequency. Fast-scan phase accumulator 1514 accumulates the fast-scan phase increment produced by PLL 1510 at the HSC rate. Accordingly, the output of fast-scan phase accumulator 1514 is a monotonically increasing phase value for a constant fast-scan frequency. Modulo operator 1518 receives the accumulated fast-scan phase value from accumulator 1514 and performs a modulo $2\pi$ operation so that the output represents the accumulated fast-scan phase in the range of $[0,2\pi]$.

Latch 1520 latches the accumulated fast scan phase for each input VSYNC. Accordingly, latch 1520 holds the residual fast-scan phase for each period of movement on the slow-scan axis. Fast-scan residual accumulator 1524 accumulates the fast-scan residual for each VSYNC to produce the accumulated fast-scan residual. Modulo operator 1528 receives the accumulated fast-scan residual value from accumulator 1524 and performs a modulo $2\pi$ operation so that the output represents the accumulated fast-scan residual in the range of $[0,2\pi]$.

The output of the modulo operator 1528 is summed with a programmable phase offset 1550 by summer 1529 and the result is multiplied with the offset gain value by multiplier 1530 and then filtered by filter 1534 to produce the slow-scan position offset value on node 1411. Filter 1534 reduces the high frequency effects of the position offset such that transients in the mirror drive signal that are attributable to the position offset are sufficiently dampened. Accordingly, filter 1534 reduces undesirable resonant frequency ringdown effects of the position offset. The gain value is a function of the mirror response. Computation of the gain value is described further below.

The programmable phase offset on node 1550 can be any value, and can be static or can change for each frame. For example, in some embodiments, the programmable phase offset is set to zero. In these embodiments, the slow-scan offset on node 1411 compensates for the accumulated fast-scan residual, and the slow-scan raster scan trajectory traces substantially identical scan trajectories from frame to frame. In other embodiments, the programmable phase offset cycles through a set of phase values from frame to frame. In these embodiments, the slow-scan offset on node 1411 not only compensates for the accumulated fast-scan residual, it also provides an arbitrary position offset on the slow-scan axis that can be advantageously used for any purpose. Use of the programmable phase offset for interleaved raster scan trajectories is described further below with reference to FIG. 22.

Slow-scan offset control circuit 1410 also produces a video buffer enable signal that is shifted in time as a function of a magnitude of the slow-scan position offset such that pixels are displayed at the appropriate time in the raster scan. As shown in FIG. 15, the slow-scan offset is multiplied by the FSYNC period and the result is added to a nominal video enable time to produce the adjusted video buffer enable signal.

Figure 17:
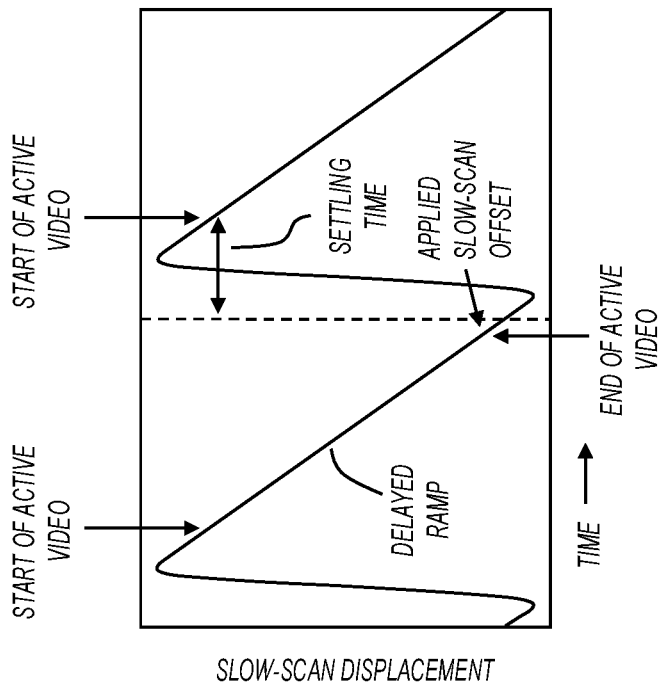
FIGS. 16 and 17 show position offsets added at different points in the mirror movement on the slow-scan axis in accordance with various embodiments of the present invention.
Figure 16:
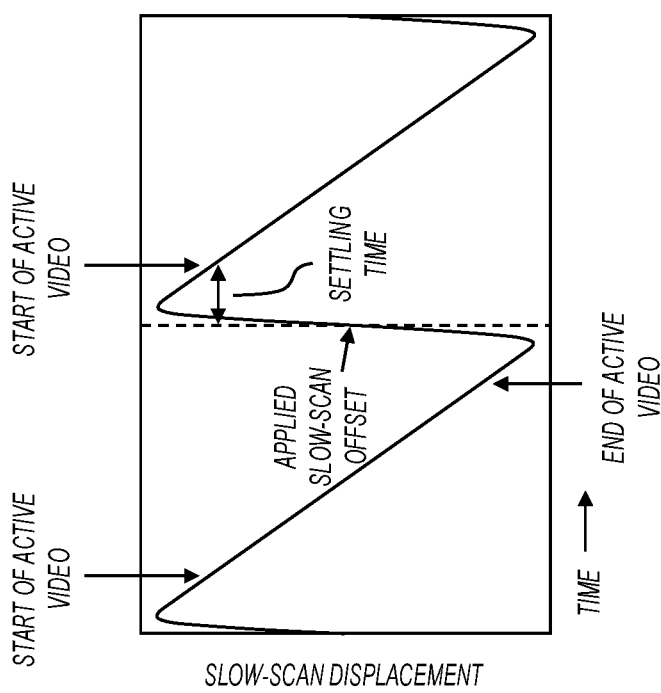

FIGS. 16 and 17 show position offsets added at different points in the mirror movement on the slow-scan axis in accordance with various embodiments of the present invention. As shown in FIG. 16, in some embodiments, the position offset is applied to the slow-scan drive signal in the flyback region. As shown in FIG. 17, in some embodiments, the position offset is applied at the end of the active region. This may be advantageous in part because there is more settling time for filter 1534 to dampen any transients before the start of the next active region. The position offset may be added into the slow-scan mirror movement at any time during the slow-scan period.

Figure 18:
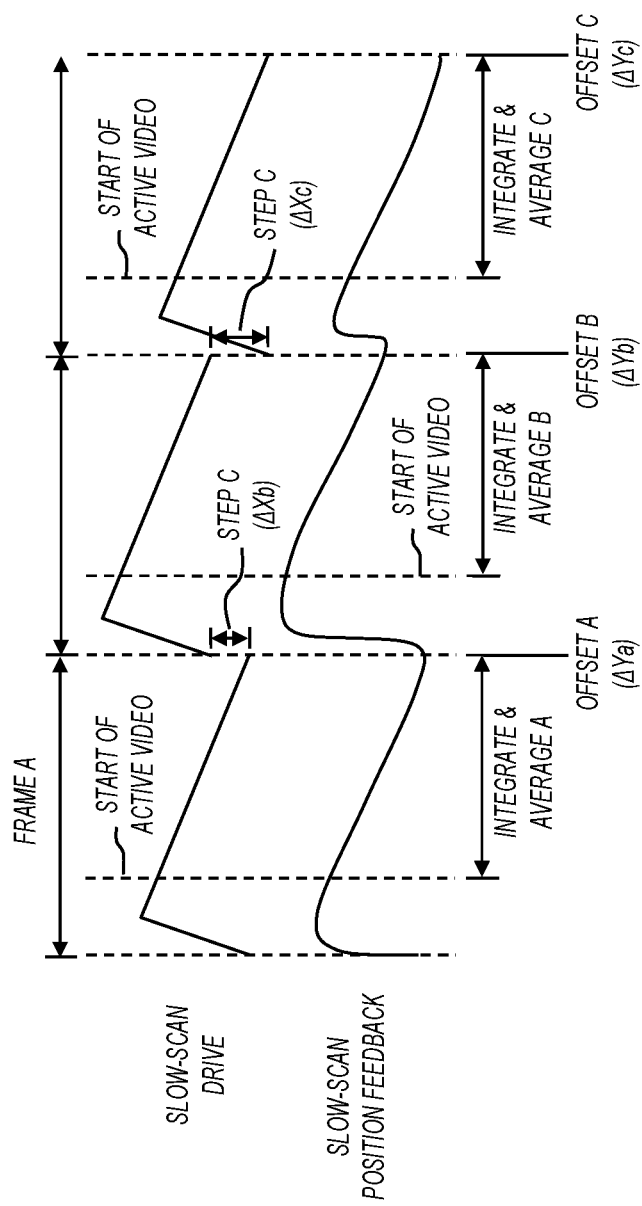
FIG. 18 shows waveforms useful for a sensitivity calculation in accordance with various embodiments of the present invention.

FIG. 18 shows waveforms useful for a sensitivity calculation in accordance with various embodiments of the present invention. The sensitivity calculations use feedback received from the mirror to ensure that the actuation gain of the slow-scan offset control circuit is matched to the sensitivity function of the mirror and driving electronics. The correct actuation gain can be adaptively controlled by estimating the change in sensed DC offset in response to a change in actuated digital offset. For example, the sensitivity of a change from frame B to frame C can be estimated as:

$$S_{B \to C} = \frac{\Delta Y_C - \Delta Y_B}{\Delta X_C - \Delta X_B} \quad (1)$$

where the numerator represents the measured change in the slow-scan mirror position and the denominator represents the applied position offset.

This sensitivity calculation is performed by drive sensitivity estimation circuit 1414 to arrive at the offset gain that is provided to slow-scan offset control circuit 1410 on node 1415.

Figure 19:
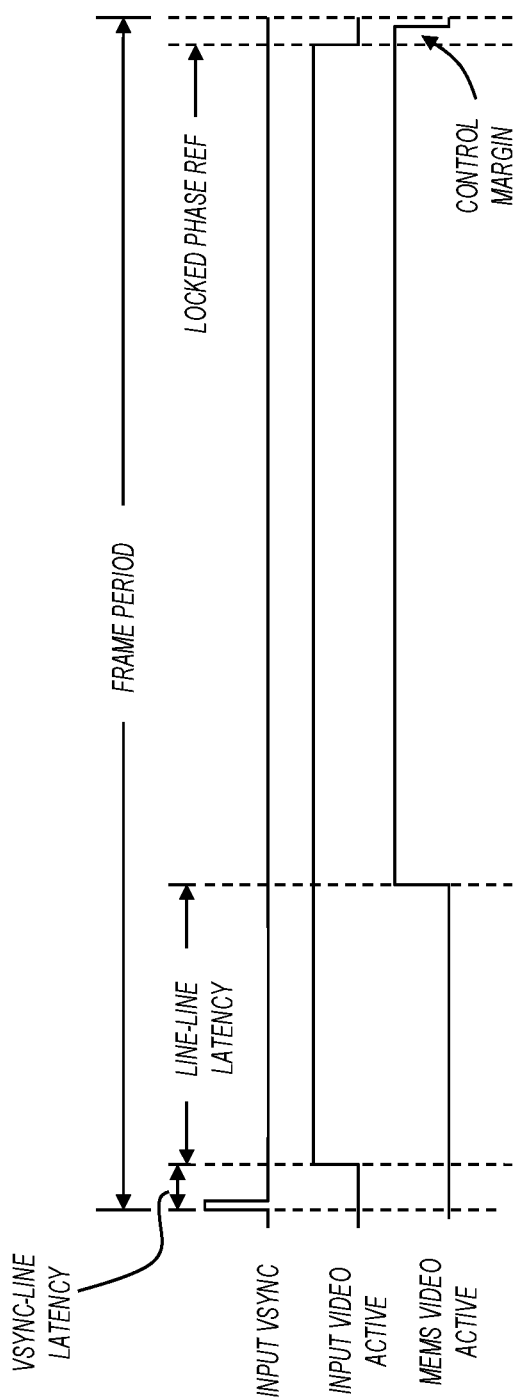
FIG. 19 shows video buffer enable timing and nominal latency in accordance with various embodiments of the present invention.

FIG. 19 shows video buffer enable timing in accordance with various embodiments of the present invention. As shown in FIG. 19, by locking the slow-scan mirror movement to an input sync signal with a programmable offset, the scanning projection system need not implement a full frame buffer, but rather can keep a small number of line buffers to manage control margin and active ratio mismatch and will never need to skip or repeat video content. If the source system can send the input video content with a similar active ratio to that of the scanning system, buffer size and line-to-line latency can be driven to nearly zero.

Figure 20:
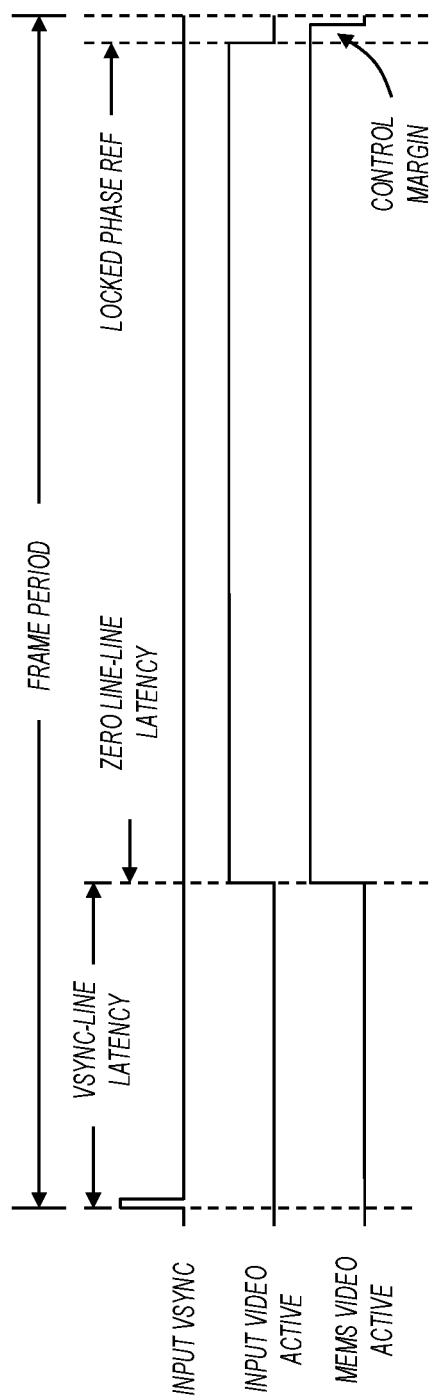
FIG. 20 shows video buffer enable timing with zero latency in accordance with various embodiments of the present invention.

FIG. 20 shows video buffer enable timing with zero latency in accordance with various embodiments of the present invention. In embodiments represented by FIG. 20, the source system sends the input video content with an active ratio that allows for zero line-line latency. In these embodiments, the need for line buffering is reduce or eliminated.

Figure 21:
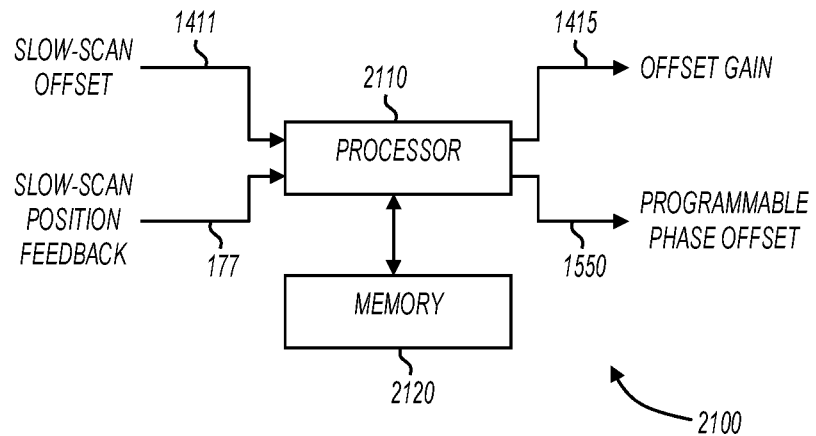
FIG. 21 shows a processing system in accordance with various embodiments of the present invention.

FIG. 21 shows a processing system in accordance with various embodiments of the present invention. Processing system 2100 includes processor 2110 and memory 2120. Processor 2110 may be any type of processor capable of communicating with, and retrieving instructions from, memory 2120. For example, processor 2110 may be an embedded processor available from application specific integrated circuit (ASIC) vendors, or may be a commercially available microprocessor. Memory 2120 may be any nontransitory storage device capable of storing information in digital form. For example, memory 2120 may be a random access memory device suitable for storing processor instructions.

In operation, processing system 2100 may be used to implement all or a portion of drive sensitivity estimation circuit 1414. For example, processor 2110 receives the slow-scan offset on node 1411 and the slow-scan position feedback on node 177. When processor 2110 retrieves and executes instructions from memory 2120, processor 2110 may perform the sensitivity calculation shown in equation (1), above, and produce the offset gain on node 1415.

In some embodiments, processing system 2100 may also provide a programmable phase offset on node 1550. The programmable offset may be a static value from frame to frame, or may be a value that changes from frame to frame. For example, when the programmable phase offset is set to zero, the slow-scan offset compensates for accumulated fast-scan residual as described above. Also for example, when the programmable phase offset is non-zero, the slow-scan offset not only compensates for accumulated fast-scan residual, but also provides the ability to inject an arbitrary phase offset on a frame by frame basis. One example use of the programmable phase offset is described below with reference to FIG. 22.

Figure 22:
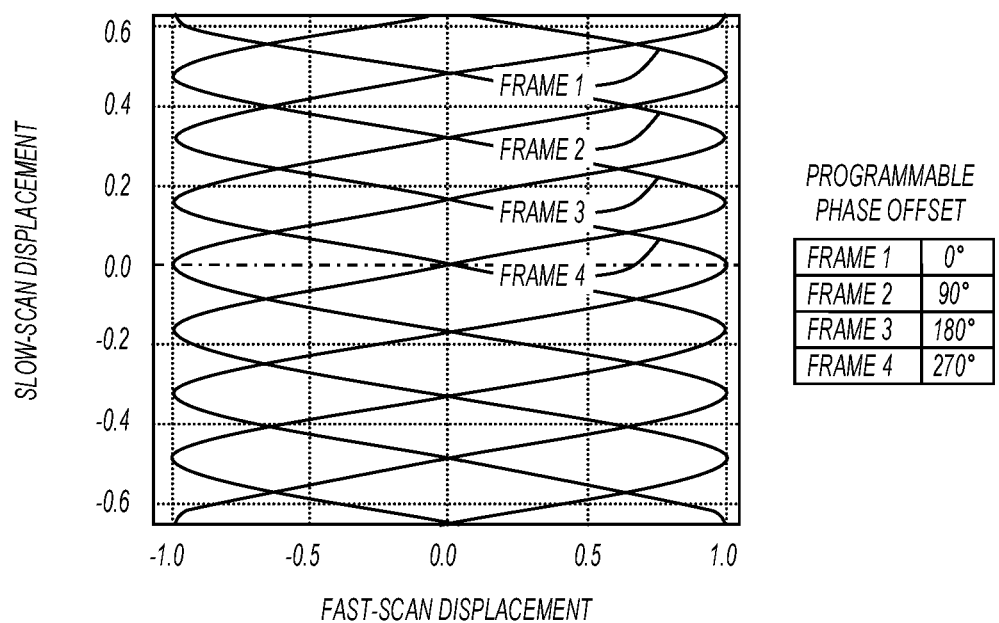
FIG. 22 shows scan trajectories having differing programmable phase offsets from frame to frame in accordance with various embodiments of the present invention.

FIG. 22 shows scan trajectories having differing programmable phase offsets from frame to frame in accordance with various embodiments of the present invention. The raster scan trajectories shown in FIG. 22 show a zoomed in portion similar the zoom values used in FIGS. 10 and 13. Raster scan trajectories from four consecutive frames are shown, labeled consecutively from one to four. As shown in FIG. 22, the programmable phase offset is cycled through four values: zero degrees, 90 degrees, 180 degrees, and 270 degrees. The result is an interleaved raster scan trajectory from frame to frame. In some embodiments, more or less than four interleaved patterns are produced based on the programmable phase offset. For example, in some embodiments, the programmable phase offset cycles between two values such as zero degrees and 180 degrees, and in other embodiments, the programmable phase offset cycles between three values such as zero degrees, 120 degrees, and 240 degrees. The number and sequence of programmable phase offset values are not a limitation of the present invention.

Accordingly, various embodiments of the present invention are capable of compensating for accumulated fast-scan residual resulting from non-integer locked modes of operation, as well as providing an arbitrary phase offset from frame to frame.

Figure 23:
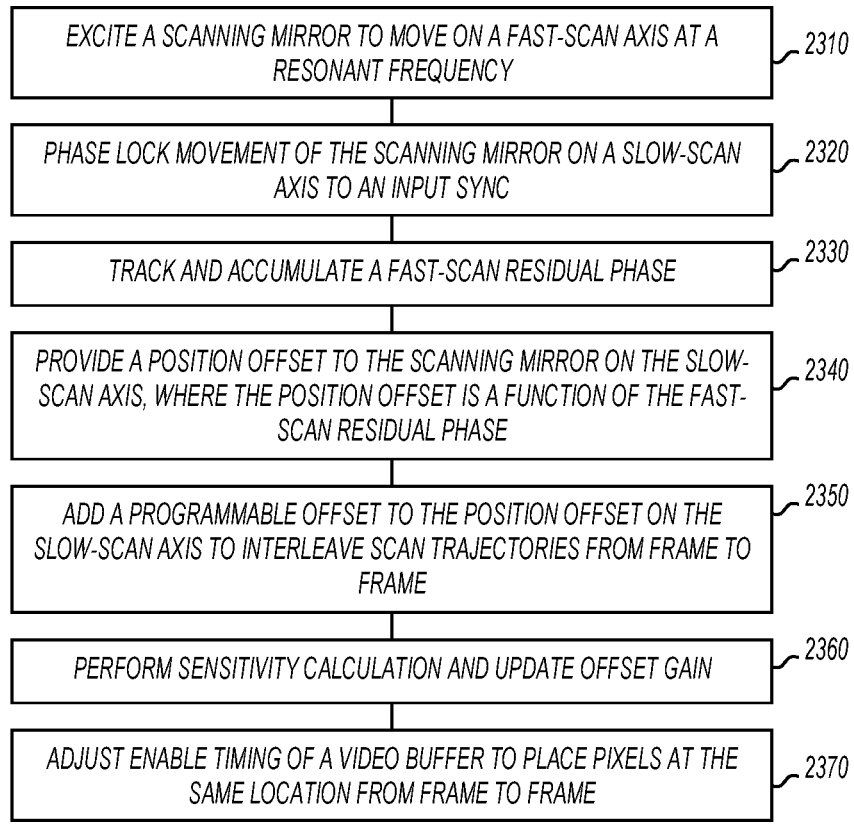
FIG. 23 shows a flow diagram of methods in accordance with various embodiments of the present invention.

FIG. 23 shows a flow diagram of methods in accordance with various embodiments of the present invention. In some embodiments, method 2300, or portions thereof, is performed by a drive circuit that controls a resonant plant such as a resonant scanning mirror device. In other embodiments, method 2300 is performed by a series of circuits or an electronic system. Method 2300 is not limited by the particular type of apparatus performing the method. The various actions in method 2300 may be performed in the order presented, or may be performed in a different order. Further, in some embodiments, some actions listed in FIG. 23 are omitted from method 2300.

Method 2300 is shown beginning with block 2310. As shown at 2310, a scanning mirror is excited to move on a fast-scan axis at a resonant frequency. In some embodiments, this corresponds to resonant fast-scan drive circuit 1430 (FIG. 14) producing a fast-scan drive signal to excite movement of mirror 116 (FIGS. 1, 2) at a resonant frequency. In other embodiments, this corresponds to resonant fast-scan drive circuit 1430 (FIG. 14) producing a fast-scan drive signal to excite movement of mirror 326 (FIGS. 3, 4) at a resonant frequency. At 2320, movement of the scanning mirror on a slow-scan axis is phase locked to an input SYNC signal. In some embodiments, this corresponds to phase locked slow-scan drive circuit 1420 (FIG. 14) phase locking movement of mirror 116 (FIGS. 1, 2) to the input VSYNC received on node 103. In other embodiments, this corresponds to phase locked slow-scan drive circuit 1420 (FIG. 14) phase locking movement of mirror 326 (FIGS. 3, 4) to the input VSYNC received on node 103.

At 2330, a fast scan residual phase is tracked and accumulated. In some embodiments, the fast scan residual results from non-integer locked modes of operation in which there is a non-integer number of fast scan cycles for each slow-scan cycle. Further the non-integer number may vary from one slow-scan cycle to the next. In some embodiments the fast-scan residual is tracked and accumulated as described above with reference to FIG. 15.

At 2340, a slow-scan axis position offset is provided to the scanning mirror, where the position offset is a function of the accumulated fast-scan residual. For example, in some embodiments, the position offset is used to place scan lines at the same location from frame to frame, thereby compensating for the accumulated fast-scan residual. In some embodiments, this corresponds to slow-scan offset control circuit 1410 (FIGS. 14, 15) producing a slow-scan offset to be added to the movement on the slow-scan axis to cause the scanning mirror to scan a substantially identical trajectory for at least a portion of each period of the received sync signal.

At 2350, a programmable offset is added to the position offset on the slow-scan axis to interleave scan trajectories from frame to frame. In some embodiments, this corresponds to a processing system, such as processing system 2100 (FIG. 21) producing a programmable offset that is added to the position offset as shown in FIG. 15.

At 2360, a sensitivity calculation is performed and the offset gain is updated. In some embodiments, this corresponds to the operation of drive sensitivity estimation circuit 1414 (FIG. 14).

At 2370, the enable timing of a video buffer is adjusted to place pixels at the same location from frame to frame. In some embodiments, this corresponds to slow-scan offset control circuit 1410 (FIGS. 14, 15) producing the video buffer enable signal to enable the video buffer at a time based at least in part on the position offset.

Figure 24:
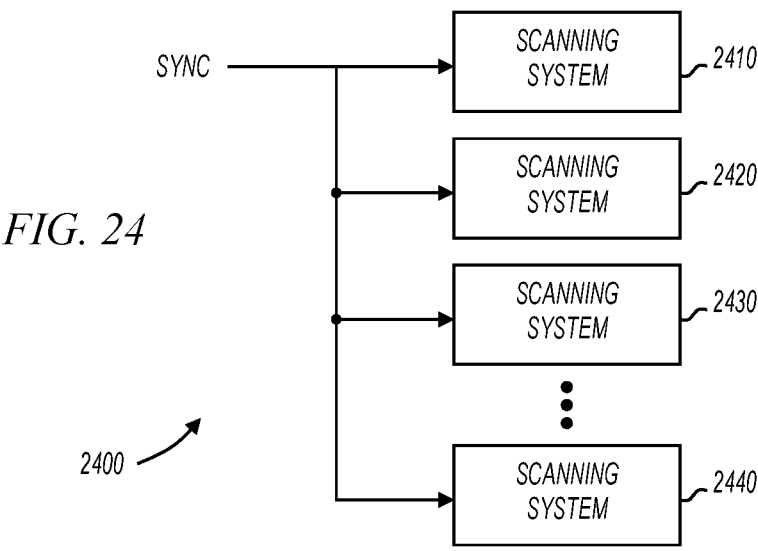
FIGS. 24-26 show a plurality of scanning systems having slow-scan movements phase locked to a single sync signal.
Figure 25:
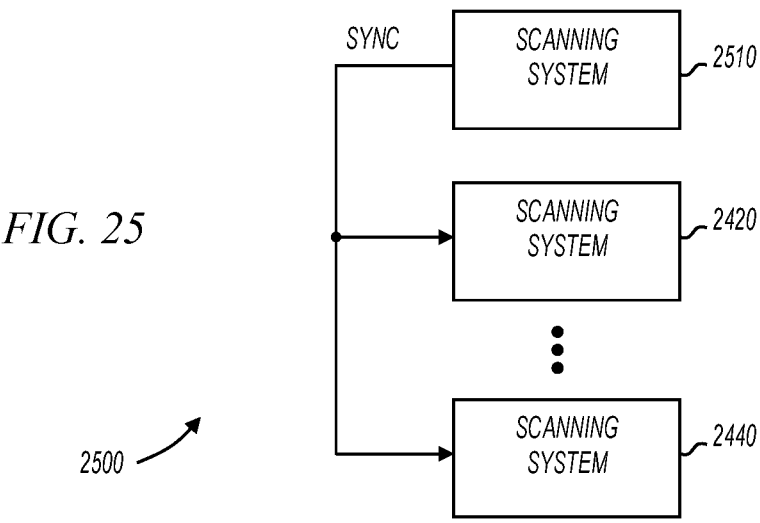
Figure 26:
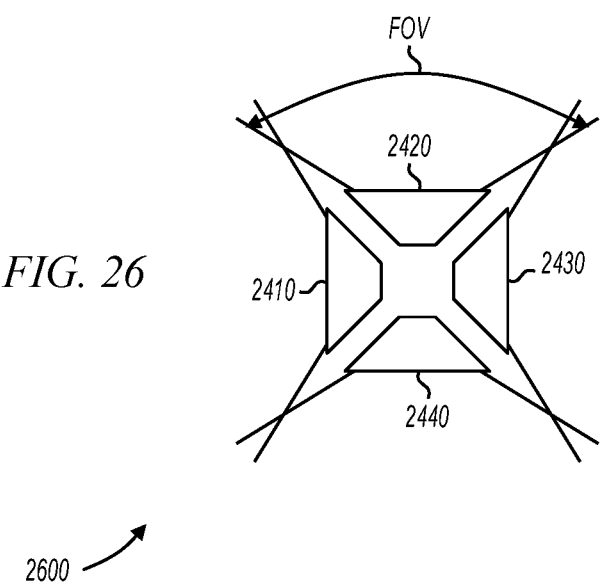

FIGS. 24-26 show a plurality of scanning systems having slow-scan movements phase locked to a single sync signal. FIG. 24 shows apparatus 2400 including scanning systems 2410, 2420, 2430, and 2440 all having slow-scan axes phase locked to a single externally provided SYNC signal. The scanning systems may be any of the scanning systems described herein. In some embodiments, the scanning systems may be projection systems that are combined to create a larger display area, where each of the scanning systems have slow-scan axes that are phase locked to a SYNC of the source video stream. Other embodiments include, but are not limited to: 1) frame locking to a VSYNC encoded into input video stream, for projection of visible light; 2) frame locking to a VSYNC provided by an external source, for synchronizing multiple resonant projection systems for scanning visible or non-visible light patterns (IR pulse/structured light, etc); 3) frame locking to a SYNC provided by an arbitrary sync signal, for synchronizing the resonant scan trajectory to any external system (camera, depth sensor, etc); and 4) frame locking to an arbitrary sync signal to synchronize a custom scan trajectory (not necessarily associated with vertical, linear displacement).

FIG. 25 shows apparatus 2500 including scanning systems 2510, 2420, and 2440. Apparatus 2500 is similar to apparatus 2400 (FIG. 24) with the exception that the SYNC is sourced by scanning system 2510 rather than by an external signal source. In these embodiments, scanning systems 2420 and 2440 have slow-scan periods locked to the slow-scan period of scanning system 2510.

FIG. 26 shows a top view of an apparatus that includes four scanning systems having overlapping fields of view (FOV). As shown in FIG. 26, apparatus 2600 includes scanning systems 2410, 2420, 2430, and 2440 positioned to have overlapping fields of view. In some embodiments, all four scanning systems have slow-scan mirrors that are phase locked to an externally provided sync signal as shown in FIG. 24. In other embodiments, three of the scanning systems are locked to a sync signal provided by the fourth scanning system as shown in FIG. 25.

Figure 27:
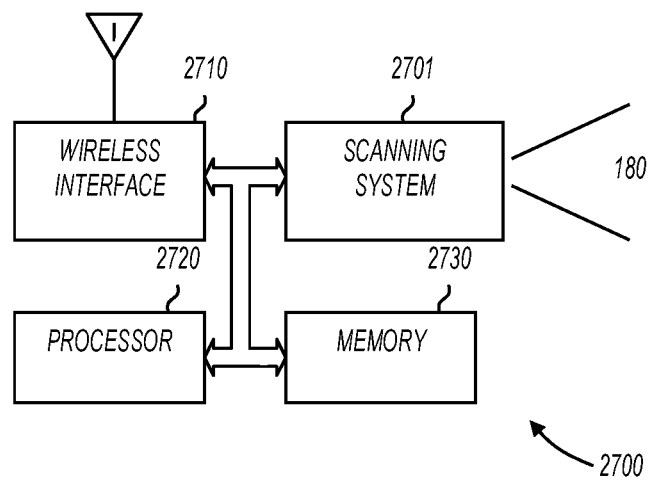
FIG. 27 shows a block diagram of a mobile device in accordance with various embodiments of the present invention.

FIG. 27 shows a block diagram of a mobile device in accordance with various embodiments of the present invention. As shown in FIG. 27, mobile device 2700 includes wireless interface 2710, processor 2720, memory 2730, and scanning system 2701. Scanning system 2701 includes slow-scan position offset circuits as described above.

Scanning system 2701 may receive image data from any image source. For example, in some embodiments, scanning system 2701 includes memory that holds still images. In other embodiments, scanning system 2701 includes memory that includes video images. In still further embodiments, scanning system 2701 displays imagery received from external sources such as connectors, wireless interface 2710, a wired interface, or the like.

Wireless interface 2710 may include any wireless transmission and/or reception capabilities. For example, in some embodiments, wireless interface 2710 includes a network interface card (NIC) capable of communicating over a wireless network. Also for example, in some embodiments, wireless interface 2710 may include cellular telephone capabilities. In still further embodiments, wireless interface 2710 may include a global positioning system (GPS) receiver. One skilled in the art will understand that wireless interface 2710 may include any type of wireless communications capability without departing from the scope of the present invention.

Processor 2720 may be any type of processor capable of communicating with the various components in mobile device 2700. For example, processor 2720 may be an embedded processor available from application specific integrated circuit (ASIC) vendors, or may be a commercially available microprocessor. In some embodiments, processor 2720 provides image or video data to scanning laser projector 2701. The image or video data may be retrieved from wireless interface 2710 or may be derived from data retrieved from wireless interface 2710. For example, through processor 2720, scanning laser projector 2701 may display images or video received directly from wireless interface 2710. Also for example, processor 2720 may provide overlays to add to images and/or video received from wireless interface 2710, or may alter stored imagery based on data received from wireless interface 2710 (e.g., modifying a map display in GPS embodiments in which wireless interface 2710 provides location coordinates).

Figure 28:
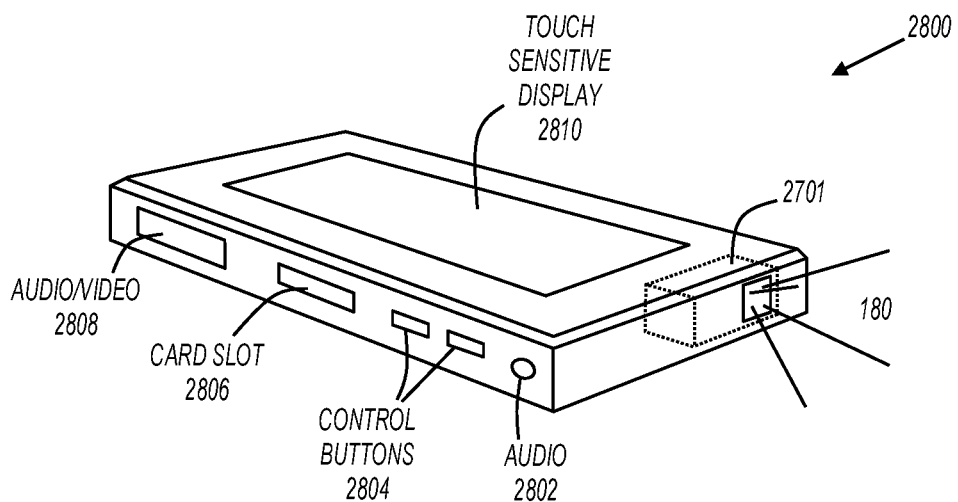
FIG. 28 shows a mobile device in accordance with various embodiments of the present invention.

FIG. 28 shows a mobile device in accordance with various embodiments of the present invention. Mobile device 2800 may be a hand held scanning laser projector with or without communications ability. In some embodiments, mobile device 2800 may be a scanning laser projector with little or no other capabilities. Also for example, in some embodiments, mobile device 2800 may be a device usable for communications, including for example, a cellular phone, a smart phone, a tablet computing device, a global positioning system (GPS) receiver, or the like. Further, mobile device 2800 may be connected to a larger network via a wireless (e.g., cellular), or this device can accept and/or transmit data messages or video content via an unregulated spectrum (e.g., WiFi) connection.

Mobile device 2800 includes scanning system 2701, touch sensitive display 2810, audio port 2802, control buttons 2804, card slot 2806, and audio/video (A/V) port 2808. None of these elements are essential. For example, mobile device 2800 may only include scanning system 2801 without any of touch sensitive display 2810, audio port 2802, control buttons 2804, card slot 2806, or A/V port 2808. Some embodiments include a subset of these elements. For example, an accessory projector may include scanning system 2701, control buttons 2804 and A/V port 2808. A smartphone embodiment may combine touch sensitive display device 2810 and scanning system 2701.

Touch sensitive display 2810 may be any type of display. For example, in some embodiments, touch sensitive display 2810 includes a liquid crystal display (LCD) screen. In some embodiments, display 2810 is not touch sensitive. Display 2810 may or may not always display the image projected by scanning system 2701. For example, an accessory product may always display the projected image on display 2810, whereas a mobile phone embodiment may project a video while displaying different content on display 2810. Some embodiments may include a keypad in addition to touch sensitive display 2810.

A/V port 2808 accepts and/or transmits video and/or audio signals. For example, A/V port 2808 may be a digital port, such as a high definition multimedia interface (HDMI) interface that accepts a cable suitable to carry digital audio and video data. Further, A/V port 2808 may include RCA jacks to accept or transmit composite inputs. Still further, A/V port 2808 may include a VGA connector to accept or transmit analog video signals. In some embodiments, mobile device 2800 may be tethered to an external signal source through A/V port 2808, and mobile device 2800 may project content accepted through A/V port 2808. In other embodiments, mobile device 2800 may be an originator of content, and A/V port 2808 is used to transmit content to a different device.

Audio port 2802 provides audio signals. For example, in some embodiments, mobile device 2800 is a media recorder that can record and play audio and video. In these embodiments, the video may be projected by scanning system 2701 and the audio may be output at audio port 2802.

Mobile device 2800 also includes card slot 2806. In some embodiments, a memory card inserted in card slot 2806 may provide a source for audio to be output at audio port 2802 and/or video data to be projected by scanning laser projector 2701. Card slot 2806 may receive any type of solid state memory device, including for example secure digital (SD) memory cards.

Figure 29:
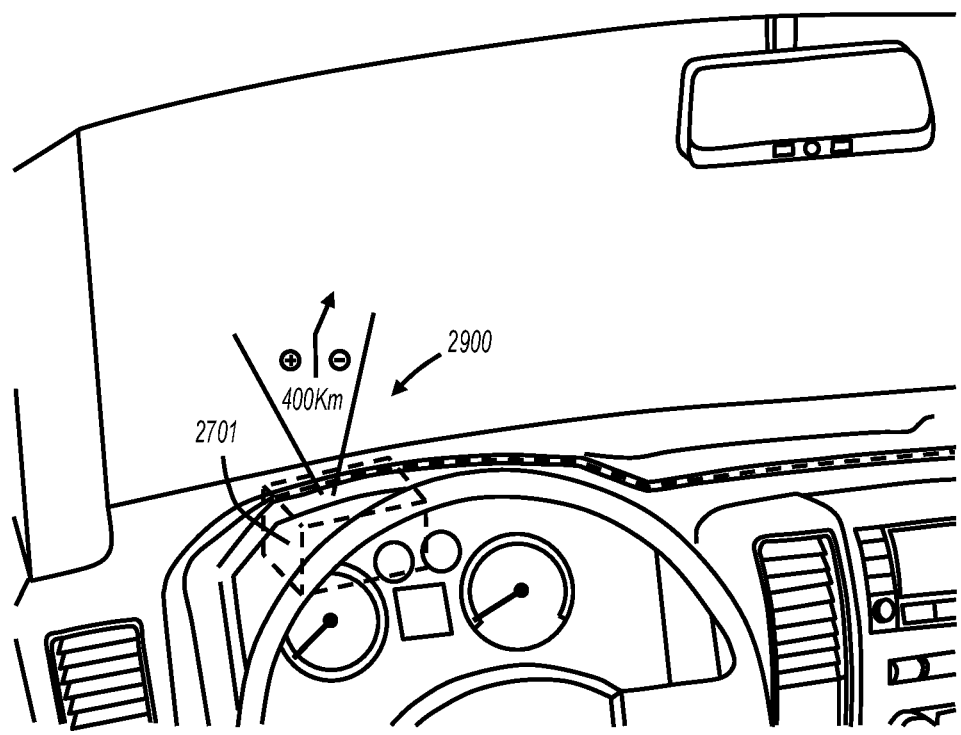
FIG. 29 shows a head-up display system in accordance with various embodiments of the present invention.

FIG. 29 shows a head-up display system in accordance with various embodiments of the invention. Scanning system 2701 is shown as a projector mounted in a vehicle dash to project the head-up display at 2900. Although an automotive head-up display is shown in FIG. 29, this is not a limitation of the present invention. For example, various embodiments of the invention include head-up displays in avionics application, air traffic control applications, and other applications.

Figure 30:
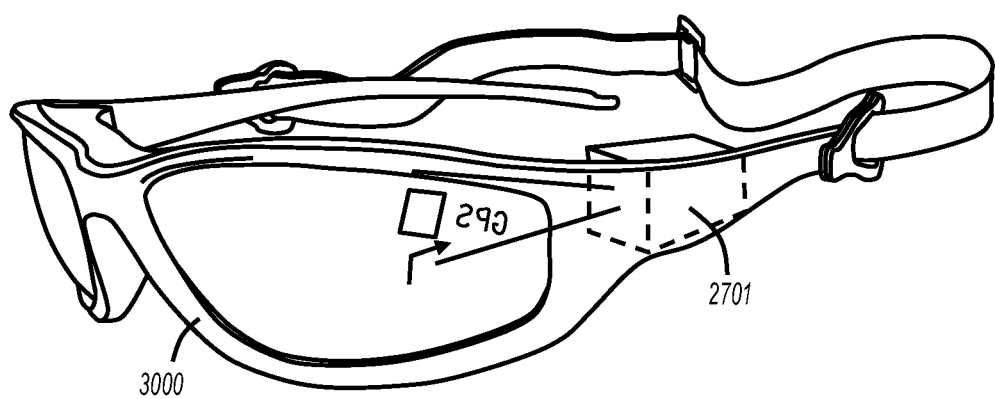
FIG. 30 shows eyewear in accordance with various embodiments of the present invention.

FIG. 30 shows eyewear in accordance with various embodiments of the invention. Scanning system 2701 is shown as a projector mounted in eyewear 3000 to project a display in the eyewear's field of view. In some embodiments, eyewear 3000 is see-through and in other embodiments, eyewear 3000 is opaque. For example, eyewear 3000 may be used in an augmented reality application in which a wearer can see the display from scanning system 2701 overlaid on the physical world. Also for example, eyewear 3000 may be used in a virtual reality application, in which a wearer's entire view is generated by scanning system 2701. Although only one scanning system 2701 is shown in FIG. 30, this is not a limitation of the present invention. For example, in some embodiments, eyewear 3000 includes two projectors; one for each eye.

Figure 31:
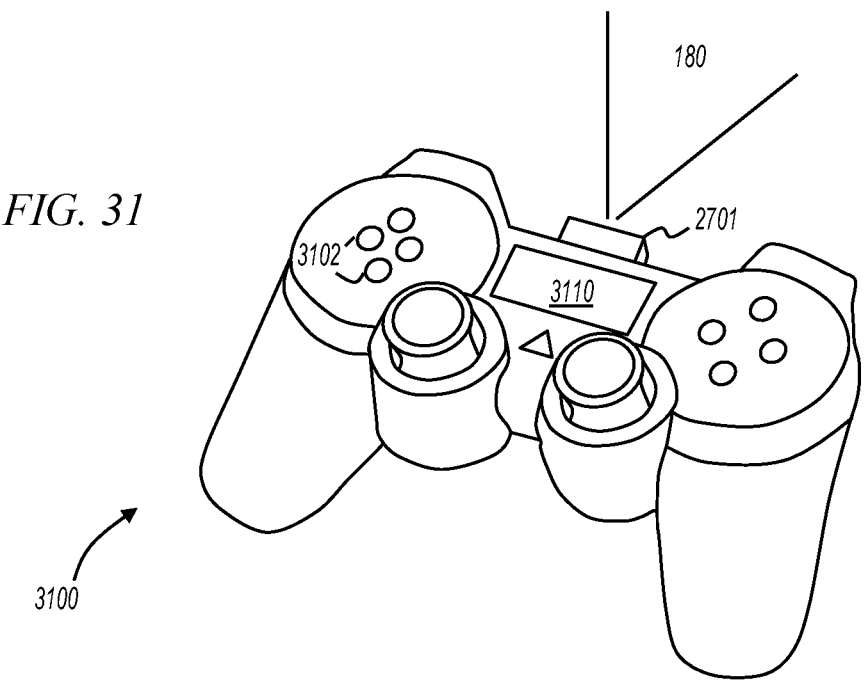
FIG. 31 shows a gaming apparatus in accordance with various embodiments of the present invention.

FIG. 31 shows a gaming apparatus in accordance with various embodiments of the present invention. Gaming apparatus 3100 includes buttons 3102, display 3110, and scanning system 2701. In some embodiments, gaming apparatus 3100 is a standalone apparatus that does not need a larger console for a user to play a game. For example, a user may play a game while watching display 3110 and/or the projected content at 180. In other embodiments, gaming apparatus 3100 operates as a controller for a larger gaming console. In these embodiments, a user may watch a larger screen tethered to the console in combination with watching display 3110 and/or projected content at 180.

Although the present invention has been described in conjunction with certain embodiments, it is to be understood that modifications and variations may be resorted to without departing from the scope of the invention as those skilled in the art readily understand. Such modifications and variations are considered to be within the scope of the invention and the appended claims.

What is claimed is:

1. An apparatus comprising:
a first scanning mirror capable of resonant motion on a fast-scan axis;
a second scanning mirror capable of non-resonant motion on a slow-scan axis; and
a control system to excite the first scanning mirror to move on the fast-scan axis at a resonant frequency of the first scanning mirror, and to produce a slow-scan drive signal to cause the second scanning mirror to move on the slow-scan axis at a frequency dictated by a received sync signal;
wherein the control system adds a position offset into the slow-scan drive signal for each period of the received sync signal to cause the first and second scanning mirrors to scan a substantially identical trajectory for at least a portion of each period of the received sync signal.

2. The apparatus of claim 1 wherein the first and second scanning mirrors comprise a single biaxial scanning mirror.

3. The apparatus of claim 1 further comprising an accumulator to accumulate a fast-scan phase residual proportional to position offset on the slow-scan axis.

4. The apparatus of claim 1 further comprising a drive sensitivity estimation circuit to estimate a gain relationship between a magnitude of the position offset added into the slow-scan drive signal and a fast-scan phase position along the slow-scan axis.

5. The apparatus of claim 4 wherein movement on the slow-scan axis includes an active region and a flyback region, and wherein the position offset is added during the flyback region, and wherein the actuation gain is estimated during the active region.

6. The apparatus of claim 1 wherein movement on the slow-scan axis includes an active region and a flyback region, and wherein the offset is added at an end of the active region.

7. The apparatus of claim 4 further comprising a filter to reduce undesirable resonant frequency ring-down effects of the position offset.

8. The apparatus of claim 1 wherein the apparatus comprises a scanning laser projector.

9. The apparatus of claim 6 further comprising a video buffer to store video data received from a video source.

10. The apparatus of claim 7 wherein the control system is configured to enable the video buffer at a time that is based in part on a magnitude of the position offset.

11. An apparatus comprising:
a signal source to provide a sync signal;
a first scanning mirror capable of resonant movement on a first axis;
a second scanning mirror capable of non-resonant movement on a second axis; and
a scanning mirror drive circuit to excite the resonant movement on the first axis, and to cause the non-resonant movement on the second axis to be phase locked to the sync signal, wherein the scanning mirror drive circuit is configured to add a position offset on the second axis for each period of the non-resonant movement to compensate for a non-integer relationship between a period of the sync signal and a period of the resonant movement.

12. The apparatus of claim 11 wherein the first and second scanning mirrors comprise a single biaxial scanning mirror.

13. The apparatus of claim 11 further comprising a plurality of scanning mirrors, each having non-resonant movement phase locked to the sync signal.

14. The apparatus of claim 11 further comprising a residual phase tracking circuit to track a residual phase on the first axis and to determine the position offset.

15. The apparatus of claim 11 further comprising a drive sensitivity estimation circuit to estimate a gain relationship between a magnitude of the position offset added into the slow-scan drive signal and a fast-scan phase position along the slow-scan axis.

16. The apparatus of claim 15 wherein movement on the slow-scan axis includes an active region and a flyback region, and wherein the position offset is added during the flyback region, and wherein the actuation gain is estimated during the active region.

17. The apparatus of 11 wherein movement on the slow-scan axis includes an active region and a flyback region, and the position offset is added at en end of the active video region and before the flyback region.

18. An apparatus comprising:
a first scanning mirror capable of resonant movement on a first axis;
a second scanning mirror capable of non-resonant movement on a second axis; and
a slow-scan offset control circuit to track a residual phase on the first axis and to add a position offset to the non-resonant movement on the second axis, the position offset being a function of the residual phase.

19. The apparatus of claim 18 wherein the slow-scan offset control circuit is configured to add a programmable phase offset to the position offset.

20. The apparatus of claim 19 further comprising a circuit to determine the programmable phase offset on a frame-by-frame basis.

21. The apparatus of claim 20 wherein the programmable phase offset cycles through a set of offset values to cause interleaved scan trajectories.

22. A method comprising:
exciting a first scanning mirror to cause resonant movement on a first axis, the resonant movement having a first period; and
exciting a second scanning mirror to cause non-resonant movement on a second axis, the non-resonant movement having a second period that is a non-integer multiple of the first period, which if not accounted for results in the resonant movement on the first axis scanning different trajectories for each second period;
wherein said exciting the second scanning mirror to cause non-resonant movement on a second axis comprises adding a position offset each second period to cause the resonant movement on the first axis to scan a substantially identical trajectory for at least a portion of each second period.

23. The method of claim 22 wherein the first and second scanning mirrors comprise a single biaxial scanning mirror.

24. The method of claim 22 further comprising receiving video data and modulating at least one laser light source during an active video region.

25. The method of claim 24 wherein said adding a position offset comprises adding the position offset at an end of the active video region.

26. The method of claim 22 further comprising enabling a video buffer at a time that is based at least in part on the position offset.

27. The method of claim 22 wherein the movement on the second axis comprises an active video region and a flyback region, and adding the position offset comprises filtering the position offset and adding the position offset sufficiently early such that transients attributable to the position offset have decayed to a negligible level prior to the beginning of the active region.

28. The method of claim 22 further comprising tracking a residual phase on the first axis to determine the position offset.

29. The method of claim 22 further comprising estimating an offset gain as a gain relationship between a magnitude of the position offset added into the slow-scan drive signal and a fast-scan phase position along the slow-scan axis, and applying the offset gain to the position offset.

* * * * *